United States Patent
Hellwig et al.

(10) Patent No.: US 9,060,350 B2
(45) Date of Patent: *Jun. 16, 2015

(54) CONNECTION SET-UP BETWEEN TWO TERMINALS

(71) Applicant: Telefonaktiebolaget LM Ericsson (publ), Stockholm (SE)

(72) Inventors: Karl Hellwig, Wonfurt (DE); Philip Hodges, Melbourne (AU); Dirk Kampmann, Vaals (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,101

(22) Filed: Dec. 12, 2013

(65) Prior Publication Data

US 2014/0169294 A1 Jun. 19, 2014

Related U.S. Application Data

(63) Continuation of application No. 13/388,072, filed as application No. PCT/EP2010/061859 on Aug. 13, 2010, now Pat. No. 8,634,838.

(60) Provisional application No. 61/234,068, filed on Aug. 14, 2009.

(51) Int. Cl.
*H04W 72/00* (2009.01)
*H04W 76/02* (2009.01)
(Continued)

(52) U.S. Cl.
CPC .............. *H04W 76/02* (2013.01); *H04L 63/30* (2013.01); *H04W 8/082* (2013.01); *H04W 12/02* (2013.01); *H04W 88/14* (2013.01); *H04W 8/08* (2013.01); *H04W 88/16* (2013.01)

(58) Field of Classification Search
CPC ...... H04L 63/30; H04W 8/082; H04W 12/02; H04W 88/16; H04W 88/14; H04W 8/08; H04W 76/02
USPC ................................... 455/445; 709/228, 229
See application file for complete search history.

(56) References Cited

U.S. PATENT DOCUMENTS 6,658,001 B1 * 12/2003 Furuno et al. ................. 370/392
2005/0268150 A1    12/2005 Llabres et al.
(Continued)

FOREIGN PATENT DOCUMENTS

EP         1158823 A1    11/2001
EP         2059087 A1    5/2009
(Continued)

OTHER PUBLICATIONS

3rd Generation Partnership Project; Technical Specification Group TSG CT, "Local Call Local Switch System Impacts; Feasibility Study (Release 9)," 3GPP TR 23.889 v 0.1.0, pp. 1-11, Jun. 2009.
(Continued)

*Primary Examiner* — Charles Shedrick
(74) *Attorney, Agent, or Firm* — Coats & Bennett, PLLC

(57) ABSTRACT

The invention relates to the setting up of a connection between an originating terminal and a terminating terminal. Both terminals may connect via the same access network. The access network accesses a core network through an access gateway. The access gateway transmits and/or receives connection set-up signalling transmitted along a signalling path through at least the core network. Using an information element in the connection set-up signalling, information on media plane access needs of nodes in the signalling path is collected and provided for determining whether a local shortcut of a media path can be established in the access network.

30 Claims, 15 Drawing Sheets

(51) Int. Cl.
  *H04L 29/06* (2006.01)
  *H04W 88/16* (2009.01)
  *H04W 8/08* (2009.01)
  *H04W 12/02* (2009.01)
  *H04W 88/14* (2009.01)

(56) References Cited

U.S. PATENT DOCUMENTS

| | | | |
|---|---|---|---|
| 2007/0263802 A1* | 11/2007 | Allen | 379/93.01 |
| 2010/0008298 A1 | 1/2010 | Hisata et al. | |
| 2011/0122827 A1* | 5/2011 | Bjorsell et al. | 370/328 |
| 2012/0129531 A1* | 5/2012 | Tao et al. | 455/436 |
| 2012/0142338 A1* | 6/2012 | Tao et al. | 455/424 |
| 2012/0225656 A1* | 9/2012 | Persson et al. | 455/436 |
| 2012/0263168 A1* | 10/2012 | Petrack | 370/352 |

FOREIGN PATENT DOCUMENTS

| | | | |
|---|---|---|---|
| JP | 2008124532 A | 5/2008 | |
| WO | 2009060046 A1 | 5/2009 | |

OTHER PUBLICATIONS

3rd Generation Partnership Project: Source GERAN, "LS on New GERAN WI on 'Local Call Local Switch'," 3GPP TSG GERAN WG2 Meeting #41, GP-090526, Agenda Item 7.2.6, St. Julian's, Malta, Feb. 16-20, 2009.

3rd Generation Partnership Project: Source LM Ericsson, "Pseudo-CR on LCLS Preference and Capability Negotiation," 3GPP TSG CT4 Meeting #47, C4-093531, Bejing, PRC, Nov. 9-13, 2009.

3rd Generation Partnership Project: Source LM Ericsson, "LCLS—Pseudo-CR on LCLS-Preference Indication," 3GPP TSG CT4 Meeting #46, C4-092971, Phoenix, AZ, USA, Oct. 12-16, 2009.

3rd Generation Partnership Project; Technical Specification Group TSG CT, "Local Call Local Switch System Impacts; Feasibility Study (Release 9)," 3GPP TR 23.889 v 1.3.0, pp. 1-99, May 2010.

Alcatel-Lucent, et al., "Local Call Local Switch: Working Assumptions and Requirements", 3GPP TSG GERAN #42, May 11-15, 2009, Shenzhen, China, Tdoc GP-091059.

* cited by examiner

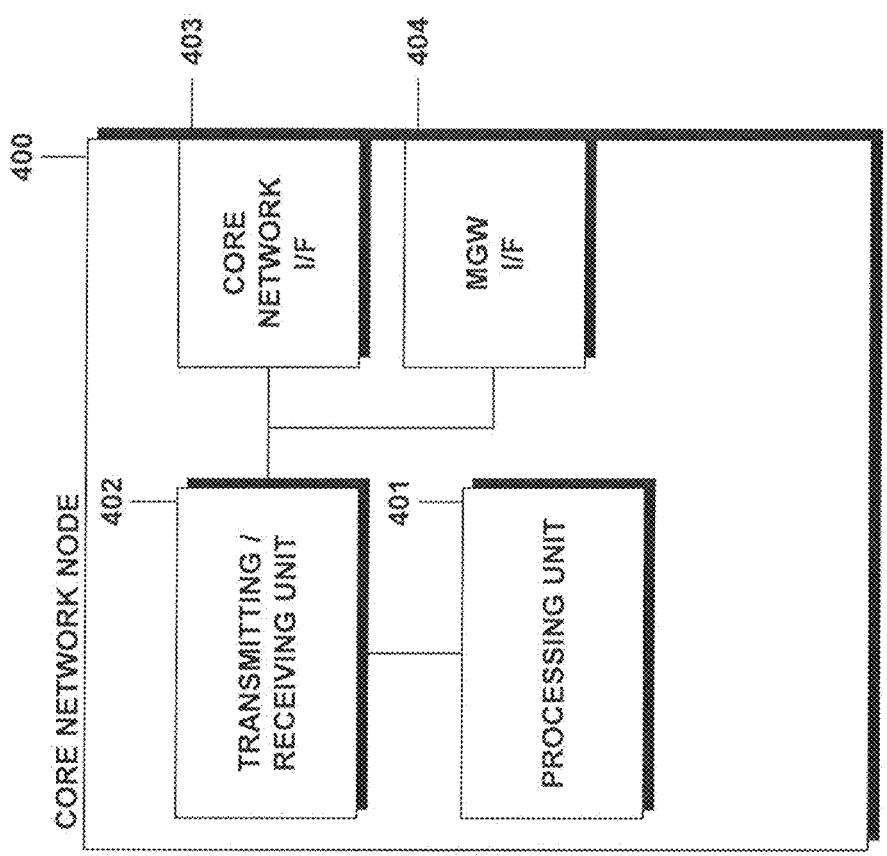

CONNECTION SET-UP BETWEEN TWO TERMINALS

RELATED APPLICATIONS

The present application is a continuation of U.S. patent application Ser. No. 13/388,072, which was filed on May 4, 2010, which is a national stage application of PCT/EP2010/061859, filed Aug. 13, 2010, and claims benefit of U.S. Provisional Application 61/234,068, filed Aug. 14, 2009, the disclosures of each of which are incorporated herein by reference in their entirety.

TECHNICAL FIELD

The present invention relates to a method of setting up a connection between an originating terminal and a terminating terminal. The invention further relates to an access gateway and to a core network node involved in the connection set-up, and to methods performed on these network nodes.

BACKGROUND

Call set-up is a standard procedure performed in a mobile communication network. The set-up procedure is initiated upon connection request of a terminal (originating terminal $T_O$), such as a mobile phone or any other type of mobile communication device, which generally connects via a radio access network. A controller of the radio access network, such as a radio network controller (RNC) of UTRAN (UMTS Terrestrial Radio Access Network) or a base station controller (BSC) of a 2G radio access network (RAN), exchanges signalling traffic with an access gateway, such as a mobile switching center (MSC) of a core network. This so-called originating access gateway (O-AGW) sends connection set-up signalling through the core network to a terminating access gateway (T-AGW), which communicates with the terminating terminal ($T_t$) through a terminating radio access network. The signalling path (also called call routing path) from the O-AGW to the T-AGW which runs on the so-called signalling plane can pass through further nodes of the core network, in particular control nodes controlling media gateways, such as further MSCs or the like. The nodes of the core network through which the signalling path runs control media gateways, by means of which a media path is established on the media plane, also called user plane, through the core network. The media path further extends from the MGW of the O-AGW and the T-AGW through the respective radio access networks to the originating terminal and the terminating terminal, respectively.

The signalling plane established by means of the access gateways and the control nodes transports signalling traffic, while the media plane established by means of the media gateways transports media contents, such as voice data, video data or other types of user data. There are several methods of setting up a connection upon receiving a request from a terminal, one of which is described in detail further below with respect to FIGS. 6A-6B. In general, the O-AGW sends a set-up message to the T-AGW, with the control nodes in the signalling (or routing) path instructing their associated media gateways (MGWs) to establish at least part of the media path.

After receiving the set-up message and exchanging signalling traffic with the terminating terminal, the T-AGW sends a response message to the O-AGW for finalizing the set-up of the media path, over which a ring back tone may be transmitted.

The media path generally comprises a forward channel (or "A-Channel"), which transports media contents in a direction from the MGW of the originating AGW to the MGW of the terminating AGW, said direction also being called downstream. The backward channel (also called "B-Channel") transports media contents from the MGW of the terminating AGW to the MGW of the originating AGW, said direction also being called upstream. Downstream may also be defined as the direction of transmission of a connection set-up message and upstream as the direction of transmission of the response message. Note that in the art, the terms upstream and downstream are not always used in the same manner. The particular meaning may need to be derived from the context in which the terms are used. As an example, downstream with respect to the B-channel may correspond to the above mentioned upstream direction, as contents is transported in backward direction on the B-channel.

The terms downstream and upstream may also be used to define a relative position of a node in the signalling or the media path. As seen from a node in the path, an upstream node can be a node preceding said node in the path and a downstream node can be a node succeeding a node in the path with respect to the direction of transmission of a particular message or contents. In such a context, an upstream (or downstream) node may be different when seen from the A-channel or the B-channel.

In some networks, the core network nodes establish the forward channel upon receiving the set-up message and the backward channel upon receiving the response message. In other networks, the nodes of the core network establish both channels upon receiving the set-up message, with the receiver addresses of the media gateways being exchanged between the control nodes by means of inter-node signalling (so called "Fast Track").

In other scenarios, such as roaming terminals, the media and signalling path can be more complex. As an example, further core networks, transit networks and the like may need to be traversed to reach the core network of a particular operator. The radio access network of the originating terminal may for example connect to an originating core network, and further via one or several transit networks to the core network of the operator. A network through which the core network is accessed may be termed access network. It may thus be a RAN, another core network, or the like.

In conventional network architectures, the media path is established through the radio access network and possibly further access networks and the core network at call set-up and kept over the duration of the call. Any node in the media path has access to the media plane, it can for example read data from the media plane (e.g. for multi-party conferences or for call storage) and it can write or insert data into the media plane (e.g. for multi-party conferences or announcements). Such supplementary services generally reside within the core network and can take advantage of such simple media plane access.

In some countries and networks, the number of voice calls that originate and terminate within one area (e.g. city or region, also termed local calls) can be relatively high. Two terminals may even reside within one radio cell. In terms of connection costs, linking to such a cell is rather expensive, it may occur e.g. by microwave links or even via satellite.

In order to reduce the connection costs, it is desirable to identify such calls and to provide a short-cut of the media path within the radio cell or radio access network, without using the whole media path through the core network. Such a short-cut of the media path may be termed "local call local switch (LCLS)". Users may benefit from providing such shortcuts as the more direct routing of the media contents may provide a higher voice quality and a lower speech path delay, while at the same time, the operator of the network may benefit from the reduced operation expenditure. A shortcut of the media path may also be termed "local shortcut".

With respect to a local shortcut, the problem arises that some of the nodes in the signalling path may require access to the media plane. If such a shortcut is switched, then core network nodes may no longer be capable of accessing the media contents, i.e. read or write to the media plane. When setting up the connection, it is often not clear which supplementary services need to be provided by the nodes in the signalling path. Services, such as lawful interception, recording services in the home network, tone insertion and announcements generally required media plane access, preventing local shortcuts. It is thus desirable to improve the end-user experience, such as distortion delay etc., and reduce the operator expenditure, such as the required resource capacity and link capacity, by improving the switching of local shortcuts. In particular, the number of situations, in which local shortcuts can be switched, should be increased. It is desirable to determine the situation in which a local shortcut can be established. Furthermore, it is desirable to determine the access needs or requirements to the media plane of the nodes in the signalling path.

It is thus an object of the present invention to obviate at least some of the above disadvantages and to improve the setting up of connections in a mobile communication network.

SUMMARY

According to a first aspect of the invention, a method of setting up a connection between an originating terminal and a terminating terminal in a mobile communication network is provided. The originating and the terminating terminals connect via an access network, which accesses a core network through an originating access gateway for the originating terminal. For the terminating terminal, it may access the core network through a terminating access gateway, which can be the same or different from the originating access gateway. At the originating access gateway, an information element is included in a set-up message for setting up the connection through at least the core network. The set-up message is then transmitted on a signalling path through at least the core network to a terminating access gateway in the core network. There may be further networks involved in the signalling path. At least one of the nodes through which the signalling path progresses enters information into the information element relating to its needs to access a media plane of the connection to be set up. The set-up message comprising the information element is received at the terminating access gateway. A response message including the information element with the collected media plane access needs is transmitted in opposite direction along the signalling path to the originating access gateway. The information on the media plane access needs of the nodes in the signalling path collected by means of the information elements is then provided for determining whether a local shortcut of a media path of said connection can be established in the access network.

The possibility of establishing a local shortcut of the media path may thus be detected reliably, which can result in an improved user experience and in a reduction of the required resources. Furthermore, it may be possible to differentiate between different situations with different supplementary services requiring media plane access, so that shortcuts may be provided in more situations.

According to an embodiment of the invention, nodes in the signalling path capable of processing the information element, i.e. enabled nodes, adapt the routing of media through their respective media gateways on the basis of their own media plane access needs and further the media plane access needs of the other nodes in the signalling path. The enabled nodes can obtain this information by means of the information element included in the set-up message and/or the response message. Resources may thus be saved if only certain nodes in the signalling path have media plane access needs.

In some embodiments, the information element may always be included in the set-up message so as to reduce the number of missed possibilities of providing a shortcut. In other embodiments, the information element is selectively included. The originating gateway may check if the originating terminal and the terminating terminal connect via the same access network. This can occur by retrieving information from a common visitor location register (VLR) storing information on terminals connecting via the access network or by receiving information on terminals connecting via the access network from a control node of the access network. It may also occur by means of a number based selection by analyzing a number of the receiving party for whether it is of a type which connects via the same access network. The information element may then only be included in the set-up message if the originating and terminating terminals connected via the same access network. Signalling overhead may thus reduced.

There are different possibilities of configuring the information element. As an example, the media path may comprise a forward channel and a backward channel. The information element may then comprise at least the following elements indicating media plane access needs: an element indicating a need to read the forward channel, an element indicating a need to write the forward channel, an element indicating a need to read the backward channel and an element indicating a need to write the backward channel. It may thus be possible to obtain a comprehensive overview over the access needs of nodes in the signalling path.

The information element may comprise elements in the form of flags for storing media plane access needs. A node may then enter information into the information element by setting the flag for the corresponding media plane access need. Flags require little storage space and can be read out easily.

The media plane access needs of each node that has entered such information may be stored separately in the information element, for example in association with a node identifier for the respective node. Entering of information into the information element may also occur by an enabled node not writing any access needs into the information element and thereby indicating that it has no access needs, or by simply entering a node identifier into the information element. By storing the information separately, the access needs of each node in the path may be identified, and furthermore, nodes that are not capable of processing the information element may also be identified.

It is also possible that each node enters the information into the information element by setting the same flag for each media plane access need. If a particular flag is set by a node, subsequent nodes may not reset the flag. The information element transmitted along the signalling path may thus accumulate the media plane access needs of the enabled nodes in the signalling path. The information element may thus be kept compact.

In an embodiment of the method, the nodes in the signalling path may set up the media path through at least the core network upon receiving the set-up message and/or the response message by setting the media gateway context and the links of their respective associated media gateway (MGW). The media path may thus be fully established and may be ready for the transport of traffic. Based on the accumulated media plane access needs, it is then determined whether media contents is to be transmitted on the media path set-up through at least the core network. As an example, if the information element indicates read access to a particular channel of the media path, media contents is transmitted on this channel. Traffic in the core network may thus be reduced and resources may be saved. The media contents may be forked, e.g. in the access network or the access gateway to both provide a local shortcut and read access.

In another embodiment, the media path is similarly established through at least the core network upon receiving the set-up message and/or the response message. Enabled nodes may then be configured to decide to set an upstream or downstream link of the media path to passive based on the media plane access needs of upstream or downstream nodes in the signalling path. Setting a link to passive means that resources for the link are assigned yet no contents are transmitted over the link. Accordingly, the contents may only be transmitted up to the nodes in the media path which have a media plane access need, further reducing traffic in the core network.

If the media path comprises a forward channel and a backward channel, this may for example be performed as follows. The terminating access gateway may include an additional information element into the response message. The enabled nodes through which the signalling path progresses enter information relating to their need to access the media plane into the additional information element of the response message. An enabled node in the signalling path may then determine from the information element received with the set-up message if any nodes downstream the backward channel have media plane access needs for the backward channel. Similarly, from the additional information element received with the response message, the node can determine if any nodes downstream the forward channel have media plane access needs for the forward channel. If there are no nodes downstream the respective channel with access needs, the node can instruct its associated media gateway to set the link downstream the respective channel to passive. The node may thus no further transmit media contents downstream the respective channel, thus reducing traffic and saving resources. This method can be performed in particular if no node in the signalling path requires write access. If write access is required, the downstream backward channel may only be set to passive if nodes upstream the backward channel have no need to write to the backward channel, and the downstream forward channel may only be set to passive if nodes upstream the forward channel have no need to write to the forward channel. Accordingly, if the first write access node comes before the last read access node, all links of the channel may be set to active.

If no contents is transmitted over a link established for setting up the media path over a certain period of time, a disconnection may be triggered for the link. This may be avoided by transmitting a heartbeat signal through such links of the media path. It is also possible to disable the detection of whether media contents is transmitted through these links in the corresponding media context manager of the media gateway which provides the respective link. The media path may thus be kept in stand-by in case contents needs to be transmitted through the core network, e.g. upon a spontaneous required read access.

In another embodiment, the enabled nodes may make use of a similar additional information element for determining upstream and downstream nodes having media plane access needs. If an enabled node determines that any nodes in the signalling path do not have media plane access needs for the respective channel (e.g. forward or backward channel) on the basis of the information element and the additional information element, then the node does not establish a media path link to the next downstream node of the respective channel, or removes a media path link already established to the next downstream node of the respective channel. As the links are either not established or are being removed, the use of resources in terms of links and context managers that are assigned by media gateways may be reduced. Further, as unused links are not set up or are removed, there may be no need for a heartbeat signal or for a disabling the detection of content transport. If write access is required, the links may only then not be established or removed if nodes upstream the respective channel have no need to write to the respective channel.

Legacy network nodes in the signalling path which are not capable of processing the information element, i.e. not enabled nodes, may further be detected. In general, the detection may occur by enabled nodes analyzing the information element received with the set-up and/or response message for nodes in the path which have not entered any information into the information element, into which each enabled nodes may for example enter an identifier.

In a particular example, the information element may comprise a node identification field, into which each enabled node enters a node identifier. An enabled node may then check if a node identifier stored in the node identification field of the information element received with the set-up message matches a node identifier of the node from which the message was received. If the node identifiers do not match, the node may set full media plane access needs in the information elements. It may thus be ensured that the legacy node has full access to the media plane. The enabled node may then write its own identifier into the node identification field of an information element. The information element may be overwritten any time so as to reduce the required storage space and accordingly signalling overhead. A simple but effective legacy node detection may thus be realized.

Besides, using an additional information element in the response message or overwriting a node identifier in a node identification field, it is certainly also conceivable to store in the information element separately for each enabled node the respective media plane access needs and a node identifier.

In the further embodiment, the information element comprises a list of access needs into which each enabled node of the signalling path enters its media plane access needs and a node identifier. Enabled nodes can then establish the media path as follows. A node which has itself a media plane access need can set up a direct connection (i.e. a media path connection) to the next upstream or downstream node that also has a media plane access need. The media path may thus bypass nodes other than the originating and terminating access gateways which do not have any need to access the media plane. Traffic in the core network may thus be reduced, and the bypassed nodes may save resources.

A node capable of processing the information element, i.e. an enabled node, which has a media plane access need may scan the list of access needs comprised in the information element of the response message for the first node downstream or upstream the signalling path that has a media plane access need. It may then set up a media path connection to the detected first node or change an existing media path connection so as to connect to the detected first node if such a node is found. The media path may thus be set up in at least the core network. This may be performed irrespective of the media channel for which an access need is detected, or it may be performed per media channel.

Legacy nodes in the signalling path may be detected by analyzing the information element. As an example, if a node from which a message with the information element is received has not entered its identifier into the list, it may be assumed that the node is a legacy node. If one or more legacy nodes are detected, a media path connection can be set up to the first enabled node upstream and the first enabled node downstream the legacy node in the signalling path. Further, media path connections can be set up by the first upstream and downstream nodes to the legacy nodes so as to establish the media path through the legacy node. As an example, the first upstream and/or downstream enabled node may fully subscribe to the media plane, i.e. enter full media plane access needs into the information element, so that by establishing the connections through the legacy network node, it may be ensured that the legacy node obtains full access to the media plane.

The information on the media plane access needs of the enabled nodes that is collected with the information element may furthermore be evaluated in order to determine whether the local shortcut of the media path can be established in the access network. Such an evaluation may be performed by one or both of the access gateways. If such a shortcut can be established, a controller of the access network may be informed that the shortcut can be established or the information on the media plane access needs may be transmitted to said controller. Based on the received information, the controller may then itself decide to establish the shortcut or instruct other nodes to establish the shortcut.

According to a further aspect of the invention, a method of setting up a connection between an originating terminal and a terminating terminal connecting via the same access network is provided. The access network accesses a core network through at least one access gateway. The method is performed by a core network node of the core network. The core network node receives connection set-up signalling for establishing the connection which is transmitted along a signalling path in at least the core network. The signalling path passes through the core network node. With the connection set-up signalling, an information element is received which stores media plane access needs of at least one node preceding the core network node in the signalling path with respect to the direction of transmission of the information element. The media plane access needs indicate the needs of a preceding node to access a media plane of the connection be set up. The core network node enters information relating to its needs to access the media plane into the information element. The information element is then transmitted with the connection set-up signalling to a next node in the signalling path. The collection of media plane access needs of nodes in the signalling path by means of the information element may thus be enabled in order to determine whether a local shortcut of a media path of the connection can be established in the access network.

In an embodiment of the method, the core network node adapts the routing of media through its associated media gateway on the basis of its own media plane access needs and the media plane access needs of the other nodes in the signalling path. These needs may be indicated in the information element received with the connection set-up signalling and/or in a corresponding information element comprised in a message received in response to the connection set-up signalling. This way, the core network node may save resources and may reduce the traffic through the core network.

In an example, the media path may comprise a forward channel and a backward channel. Besides the information element received with the connection set-up signalling, an additional information element storing media plane access needs of at least one node preceding the core network node in the signalling path with respect to the direction of transmission of the additional information element may be received with a corresponding response message. It may then be determined from the information element and from the additional information element whether any nodes in the signalling path have media plane access needs for the forward channel or the backward channel. The core network node may then set media gateway context and links of its associated media gateway in order to establish the media path through the core network. This may be performed such that if it is determined from the information element and the additional information element that there is no need to transport media contents downstream the forward or backward channel, the downstream media link for the respective channel is not established or if it was previously established, is removed. It is also possible to set the downstream media link for the respective channel to passive, meaning that no content is transmitted over the media link. The core network node may then trigger the sending of a heartbeat signal over the passive link, or it may disable the detection of whether media contents is transmitted through the passive link in the corresponding media gateway context manager.

In another embodiment, the information element comprises a list of access needs into which each enabled node in the signalling path enters its media plane access needs and a node identifier. With a response message to the connection set-up signalling, the information element with the list of access needs is received. If the network node has an own media plane access need, it scans the list comprised in the response message for the first node downstream or upstream in the signalling path that has media plane access needs. It then sets up a media path connection to a detected first node or changes an existing media path connection so as to connect to the first node, if such a node is found. The media path in at least the core network may thus be set up. If it does not have any media plane access needs, it may refrain from setting up media path connections, so that it is bypassed by the media path. The core network node may thus save further resources as no context manager and links need to be assigned.

The information element may be configured as described above. In particular, it may comprise elements for indicating read and write access needs to forward and backward media channels, the elements may be provided in form of flags, and the information element may store the access needs in accumulated form or separately for each enabled node.

The method may furthermore comprise any of the steps described above with respect to a core network node. It may for example perform a detection of legacy network nodes by analyzing the information element, e.g. by comparing an identifier entered by the last preceding enabled node with an identifier of the preceding node in the signalling path.

According to a further aspect of the invention, a network node for a core network adapted to set up a connection between an originating terminal and a terminating terminal which connect via the same access network is provided. The access network accesses the core network through at least one access gateway. The core network node is configured to perform any of the methods mentioned above with respect to a core network node.

The invention further relates to a method of setting up a connection between an originating terminal and a terminating terminal connecting via the same access network, the access network accessing a core network through at least one access gateway, the method being performed by the access gateway. In the method, connection set-up signalling for establishing the connection is received, the signalling being transmitted along a signalling path in at least the core network. Information on the needs of nodes in the signalling path to access a media plane of the connection to be set up is collected by retrieving an information element from the received connection set-up signalling. The information element stores the media plane access needs of at least one of the nodes in the signalling path. The so collected information on the media plane access needs is provided for determining whether a local short cut of a media path of the connection can be established in the access network. By having this information available, a reliable determination of whether a short-cut is possible may be achieved, which in turn may result in an improved user experience and reduced operational expenditure if such a shortcut is established.

In an embodiment, the access gateway is an originating access gateway through which the core network is accessed for the originating terminal. The originating access gateway may then further include an information element in a set-up message for setting up the connection through at least the core network and transmit the set-up message on a signalling path through at least the core network to a terminating access gateway in the core network. The above-mentioned received connection set-up signalling may then be a response message which is transmitted by the terminating access gateway in response to the set-up message. The response message may then comprise the information element of the set-up message in which at least one of the nodes along the signalling path has entered its media plane access needs. The access gateway may certainly itself enter its own media plane access needs into the information element before transmitting the set-up message.

In another embodiment, the access gateway is a terminating access gateway through which the core network is accessed for the terminating terminal. The above-mentioned set-up signalling may then be a set-up message which is transmitted by the originating access gateway of the core network along the signalling path and received by said terminating gateway and which comprises the information element. The terminating access gateway may then transmit a response message including the information element with the collected media plane access needs in an opposite direction along the signalling path to the originating access gateway. It may for example copy the received information element into the response message. The terminating gateway itself may certainly enter its own media plane access needs into the information element before transmitting the response message. Any enabled node along the signalling path may thus be informed of the access needs.

In a further embodiment, the terminating gateway may include an additional information element into the response message so as to enable at least one of the nodes through which the signalling path progresses to enter information relating to their need to access media plane into the additional information element. By means of the two information elements, nodes in the signalling path may determine whether upstream or downstream nodes have media plane access needs.

Again, the information element may be configured as described above.

Furthermore, the method may comprise any of the steps described above which can be performed by an access gateway. As an example, the access gateway may determine from the information collected with the information element whether a shortcut in the access network is possible and provide corresponding information to a control node of the access network.

As the access gateway may also be considered the core network node, it may further perform any of the steps described above with respect to core network nodes. It may for example reconfigure the media path of its associated media gateway to a next node in the core network.

A further aspect of the invention provides a corresponding access gateway of a core network adapted to set up a connection between an originating terminal and a terminating terminal connecting via the same access network. The access gateway can be configured to perform any of the methods described above with respect to an access gateway.

The invention further provides an electronically readable data carrier with stored electronically readable control information configured such that when using the data carrier in a computer system, the control information performs any of the above methods. Furthermore, a computer program product that can be loaded into the internal memory of a computer system is provided, said product comprising software code portions for performing any of the above described methods when the product is executed. The product may be provided on a data carrier.

It should be clear that the features of the aspect and embodiments of the present invention mentioned above and explained further below can be used not only in the respective combinations indicated, but also in other combinations or in isolation without leaving the scope of the present invention.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

FIG. 16 schematically illustrates a core network node according to an embodiment of the invention.

DETAILED DESCRIPTION

Figure 1:
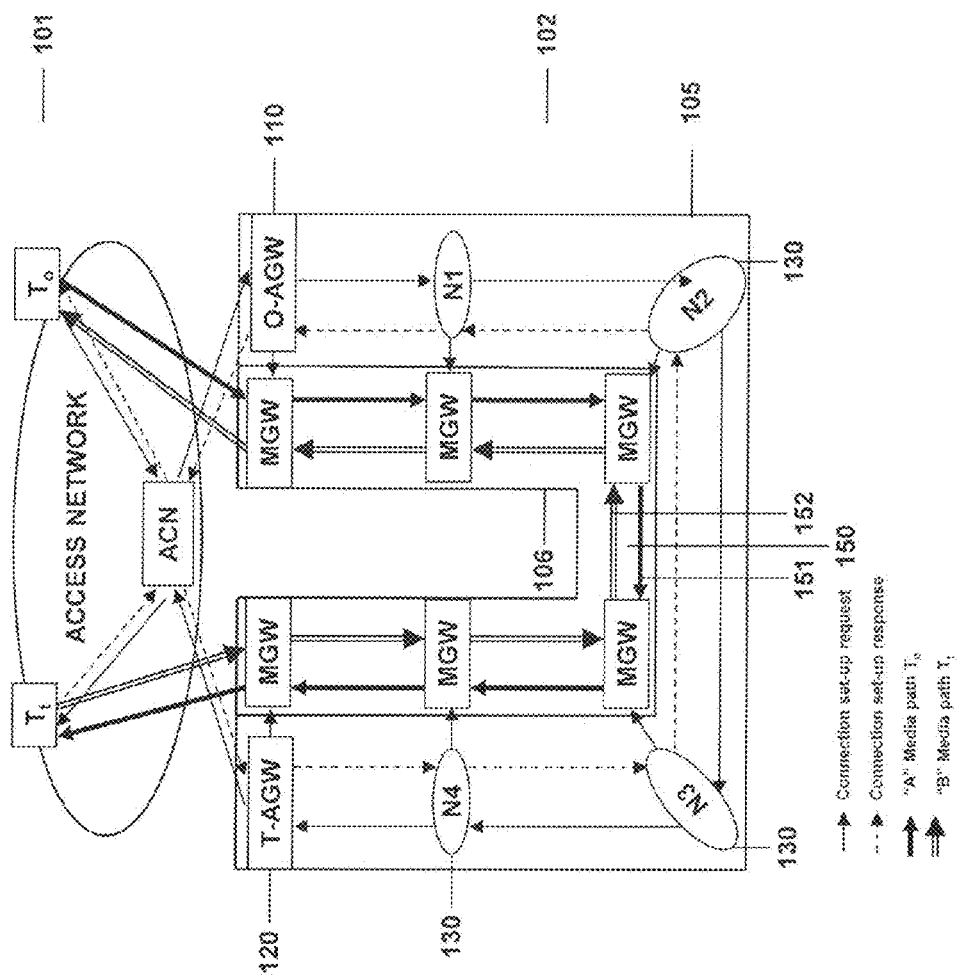
FIG. 1 schematically illustrates the connection of a originating terminal and a terminating terminal via the same access network to a core network comprising a signalling plane and a media plane.

In the following, the invention will be explained in more detail by referring to exemplary embodiments and to the accompanying drawings. The illustrated embodiments relate to techniques for establishing a connection in a mobile communication network, e.g. a mobile communication network according to the 2G ($2^{nd}$ Generation) or 3G ($3^{rd}$ Generation) technical specifications. However, it is to be understood that the concepts as described herein may also be applied to other types of mobile communication networks, e.g. WLAN (Wireless Local Area Network) networks, Wimax networks, LTE (Long Term Evolution) networks, and the like.

If two terminals, e.g. user equipment (UE) such as mobile phones, computer terminals or the like connect to a core network via the same access network, it may be possible to establish a shortcut on the media plane in the access network. Such a shortcut should be in accordance with the requirements of the nodes in the regular signalling or routing path for accessing the media plane. In some instances, for example when read access is required, a shortcut may still be established, e.g. by forking media contents in the access network so that both shortcut and read access can be realized simultaneously. In other instances, for example when write access to the media plane is required, it may be determined that a shortcut is not possible. A problem is how the access gateway(s) in the core network determine the required media plane access needs of nodes in the signalling path. This problem is general for all access networks that might have roaming terminals and use a circuit switched (CS) signalling path through the core network(s) for establishing a shortcut connection between terminals connected in that network. Embodiments of the invention solve this problem by collecting the required information on media plane access needs at the access gateways using an information element transmitted with connection set-up signalling.

In general, access networks access the core network through access gateways. An access network can be any type of network, such as GSM (global system for mobile communications), UMTS (universal mobile telecommunication system) or LTE (long term evolution) radio networks, but also WLAN/WIFI or "cable-tv" networks, core networks of other operators (e.g. connection via an international exchange), and the like to mention just a few examples.

The access gateway sets up the signalling path through the core network. This is performed for controlling the connection between the terminals. The actual content exchanged between the terminals (voice etc.) is transported over a media path through the core network(s). This media path would actually not be required or could be shortcut when terminals connect via one and the same access network. The terminals may for example reside within the same radio access network.

Shortcutting inside the access network, like LCLS (local call local switch) in a GERAN (GSM EDGE radio access network), can provide large benefits from both end user experience (distortion, delay etc.) and operator (assigned resource capacity in sense of context handlers in the media gateways and link capacity). In conventional systems, shortcutting should however only be performed if the access gateways can assure that none of the involved core network nodes actual need the content passing over the media plane. Examples of situations where this media access would be required are lawful interception (read access), recording services (read access) in the home network, Tone-insertion and announcements (write access), etc. The access gateway does generally not have such information available.

The solution according to an embodiment is based on the following principle: the Originating access gateway (O-AGW) (i.e. the gateway via which the origination terminal To connects) includes in the set-up message through the signalling plane an information element, e.g. a registration field, by means of which subsequent nodes through which the signalling path progresses can subscribe to the media content. Subscribing means that the nodes indicate a need or requirement to access the media plane, e.g. read from or write to a particular channel of the media path. A set-up message can be any message that the originating gateway transmits to the terminating gateway in the set-up process.

The Terminating access gateway (T-AGW) (i.e. the access gateway via which the terminating terminal (Tt) connects to the core network) returns in the response message the accumulated subscriptions (e.g. by copying the information element into the response message), which follows the opposite route to the originating gateway. Both gateways and all nodes inside the path have now a view on media requests. Based on this information, it can be decided to have a short cut inside the access network, such as a LCLS. The response message can be any message that the terminating gateway transmits in the set-up process after receiving the set-up message.

Note that origination and terminating gateways may be identical or combine in one device.

Shortcutting is not necessarily prohibited when a node would subscribe to the media content, e.g. if it only needs READ access. The media content can in that case be forked (copied) in the access network or at the access gateways so that the local shortcut can still be provided. Similarly, a shortcut may be established even if a node in the path requires write access. In such a case, media content of both streams (CN stream originated at node requiring write access and shortcut stream) may be merged, e.g. in the access network or at the access gateways.

The access gateways can always include the information element in the set-up message in order to determine if nodes require the media plane. This would however not be required in all cases as only for a percentage of all requested connections a local short cut would be possible. On the other hand, even if it is determined that a shortcut can not be established, it may be possible to assign fewer resources in the media path based in the information in the information element (IE) which would bring benefits.

An example is the use of a global call reference (GCR) number by the originating gateway. The terminating gateway can then easily detect that the originating gateway is in the same pool, or part of the network of the same operator or even the same access gateway as the ID of the originator is part of the GCR number. For this, the origination gateway may always insert the information element. The terminating gateway may then decide not to copy the information element into the response when detecting that shortcutting would bring no benefits. The originating gateway and all nodes in the signalling path will recognize the absence and resume normal media plain establishment. Signalling overhead may thus be reduced.

By always including the information element, the instances in which the possibility of providing a shortcut of the media path is missed can be reduced. In the core network, several functions and services are known that can alter the B-number, i.e. the number of the party being contacted or called. Best known are call forwarding (like mobile to fixed, fixed to internet telephony, mobile to internet telephony, satellite mobile to fixed etc.) and call deflection or selection like when calling a group number and one terminal of that group is selected as B party (or receiving party) which is common for business numbers. Another example is area based routing where a country wide number is translated in the B-number of the nearest shop or agent of the nationwide chain. And again, the agent or shop person might have forwarded again to his mobile because he is just making deliveries and no one is in the shop. So the O-AGW can generally only be sure about the whereabouts of the B-party (or called party) when he gets back the response and from that can retrieve that the B-party is actually in the same access network. Based on this information and the collected access needs of the nodes along the signalling path, a decision can be made on whether a shortcut is possible.

A possibility of reducing the signalling traffic is to determine upfront if a shortcut is in principle possible, and transmitting the information element only if the shortcut is possible, i.e. selectively.

As an example, the originating gateway could be triggered by the access network (for example by a controller in the access network) that a local short cut is possible. If both terminals connect via the same access network, they will generally connect via the same controller, e.g. via the same base station controller (BSC), the same radio network controller (RNC), the same eNodeB or the same international exchange. The access network controller (ACN) has accordingly the information available that both connect via the same access network and can provide this information to the access gateway.

Another possibility is that the originating access gateway itself detects that a local short cut would be an option. An example is illustrated with access gateways in form of two MSC's. Each MSC has a local repository (VLR: visitor location register) containing details of the terminals connected via that MSC. An operator owning an access network might have several MSC's, which might be grouped in pools. Problem is that one MSC has typically no notion of terminals connected to the other MSCs, which reside in the same access network. A possible solution is that the local VLR's are in one distributed database over all MSC's (or all MSC's in a pool). Each MSC has its own local part of the VLR in which it reads and writes information. When writing information it is automatically copied in broadcast to all other MSC's for updating their distributed VLR database. This way, an MSC can check for a connection to be set-up if the other terminal is present in its own VLR or in one of the other MSC's belonging to the same network. The O-AGW can accordingly determine if the called party is in the same access network.

The called parties number may also be used for detecting a common access network. Yet it is not always possible to see if the called party is of the same type that could be attached in the access network. A particular problem is number porting, e.g. where a fixed number is kept if a connection is moved from fixed connection to internet connection.

By the above means, the originating access gateway (e.g. MSC) can quickly detect the possibility of a Local Shortcut and initiate the signalling procedure through the Core Network(s). The terminating gateway (e.g. MSC) follows automatically when it detects the presence of the information element and returns the accumulated answer, i.e. the response message with the information element storing the collected media plane access needs.

For determining which option to use, the operator of the core network may weight different factors, such as the percentage of calls that could have had a local shortcut (based on both parties in the same access network), the cost/effort of always or selective inclusion of the information element in the connection set-up signalling, the gain by providing a shortcut, the percentage of cases where a local short cut could have been established in principle (i.e. as both terminals connect via the same access network) but was not possible as there was a node in the core network that required access to the media plane after all. Most of this data can be retrieved from call data records stored in the billing and charging system and/or settling logs of clearing houses between operators. The operator thus has information available for deciding whether to always or selectively include the information element, and which criterion/option to use for selective inclusion.

The information element that is transmitted with the connection set-up signalling, i.e. with the set-up message or the response message, can be implemented differently. One possibility is to obtain "accumulated" simple media plane access requirements (or needs) in four simple flags: For two channels of the media path (forward channel (FW) from To to Tt and backward channel (BW) from Tt to To), the following flags can be provided in the information element:

Need_Read_FW: yes/no
Need_Read_BW: yes/no
Need_Write_FW: yes/no
Need_Write_BW: yes/no.

If an enabled node in the signalling path has a media plane access need, it sets the corresponding flag to "yes" (or binary "1" or the like). If the flag was already set by a preceding node, it is not modified any more. Accordingly, the four flags store the access needs of enabled nodes for the whole media path. An advantage of such a implementation is its simplicity, and that the information field is not growing.

A further improvement may be achieved by providing these four flags per intermediate link between two nodes or separately for each node. Individual shortcuts may then become possible, such as bypassing one or more MGWs of the nodes in the signalling path through the core network(s). Such a list provided in the information element would increase along the routing path and would need substantially more information, accumulated in a dynamically growing list of nodes.

Furthermore, a node identification field may be provided in the information element. There may be a individual field per node into which each enabled node enters its node identifier, or a single field may be provided which is overwritten by each enabled node along the signalling path.

Based on the information collected by means of the information element, it can not only be determined whether a local shortcut can be established, but also an adaptation of the media path through the core network becomes possible. As an example, if none of the nodes along the signalling path through the core network(s) have any access needs, the media path may not be established at all. On the other hand, if a node needs write access, a full media path may be established. Even in cases where a local shortcut is not possible can an adaptation of the media path in the core network(s) be performed, resulting in reduced media traffic and the saving of resources. The signalling method as indicated will in the following be further explained by means of four implementations for the Media Plane handling, denoted as Basic detection (Media Plane kept in hot stand by), Cold stand by of the Media Plane, Reduced media path and Adaptive media rerouting. It should be clear that further implementations or a combination of the features of the implementations are certainly conceivable A first implementation (hot standby) provides the access gateways with the ability to detect during the ongoing connection if an internal node requires WRITE access to the media content by just observing the Media Plane, i.e. without Control Plane interaction. The actual media path is fully set-up and available even when not used. READ access which is spontaneously required by a node in the path is not detectable, so this method is not fully symmetrical. Based on the access requirements collected by the information element, it can be determined whether media contents is to be transmitted over the fully set-up media path. As it is fully set-up, the connection can be switched over from local shortcut to the media path through the core network efficiently, e.g. if spontaneous write access is detected. As mentioned above, it is also possible to merge the media streams upon spontaneous write access, so that the local shortcut can be maintained.

A second implementation (Cold Standby) enables the nodes in the signalling path (outer and inner nodes) to decide if they should provide an active link or a passive link. Passive is defined not only for the link but also for the context manager in the media gateway. Passive means that there is no content being transmitted, only the resources are assigned. In general this will already free substantial processing power and link capacity.

A third implementation (reduced media path) enables the nodes in the signalling path to actually reduce resources by not setting up the media path further to a succeeding node when no succeeding (or, for write access, preceding) node has subscribed. Major advantage is the reduction in resource utilisation. Negative aspect is that both, the hot standby and the cold standby are gone. Changes in the general media context could require set-up of additional upstream media paths.

The fourth implementation (Adaptive media rerouting) enables the nodes in the signalling path to reroute the media path not following the original signalling path. The node will make a direct media path connection to the next node that has subscribed (i.e. has media plane access needs), bypassing MGWs of nodes not having subscribed. This implementation brings major reductions in resource utilisation and also reduces accumulated delays through media gateway (MGW) context managers and joining links. If the general media context changes and would require modification to the routing, this may be dealt with by setting up shadow routing and switching over.

An aspect for attention is that a passive media path, i.e. a link over which no contents is transmitted, may provide some problems in the context managers of the MGW's. Currently, these will trigger disconnection when for a certain period of time no media content is provided trough them. A possible solution can be that media context mangers have an adapted possibility for inhibiting this detection. This will mean that the node has to actively remove it when the terminal to terminal connection is disconnected.

Another option is the application of a heartbeat signal on passive links. An MGW setting a passive link also introduces a heart beat into that link, e.g. under control of the corresponding core network node. This has special advantages for the problem of not enabled nodes in the signalling path (nodes in the signalling path that have not been adapted for the possibilities of subscribing to media streams, i.e. that are not capable of processing the information element), as the heartbeat signal prevents them from going to the disconnect state.

Figure 2:
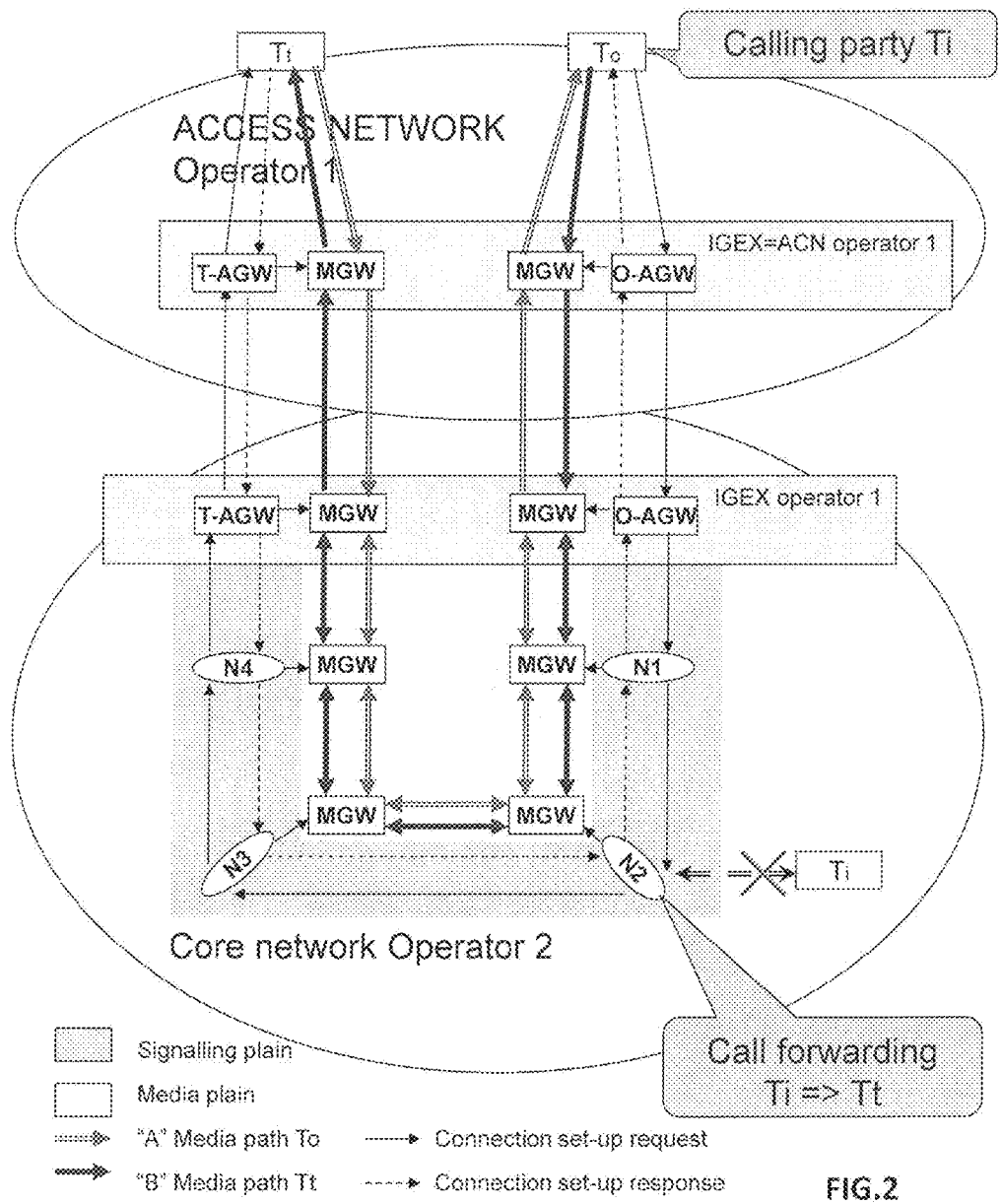
FIG. 2 schematically illustrates the signalling path and media path from an originating terminal to a terminating terminal through an access network in form of a core network of first operator and through a core network of a second operator.

FIGS. 1 and 2 illustrate implementations of the invention in two different scenarios. In the scenario of FIG. 1, the access network 101 is shown in general, it may be a radio access network (RAN) via which To and Tt connect to the core network 102. In the scenario of FIG. 2, the access network is a core network (CN) of a first operator via which To and Tt connect to the core network of a second operator. For the former, a local shortcut may be established in the RAN whereas for the latter, a shortcut may be possible in the CN of the first operator.

FIG. 1 shows a schematic view of a media path 150 through the core network 102 based on a connection request of a terminal To. Several inner nodes are involved in the media path 150 denoted N1 to N4. These nodes may be control nodes controlling associated media gateways. Note that the control node and the media gateway may be implemented in a single node or as separate nodes. The media path has typically two channels A (reference symbol 151) and B (reference symbol 152) as seen from point of content deliverance by the A and B party (originating and terminating terminals To and Tt, respectively). These channels are also called "forward channel" (A) and "backward channel" (B), seen from the call set-up direction (=forward). Each channel is unidirectional but a node can request to just read from it or write also into it.

The diagram differentiates between the signalling plane 105 comprising the control nodes (O-AGW, T-AGW and N1-N4) responsible for connection setup and the provisioning of supplementary services and the media plane 106 (also termed user plane). The media plane 106 comprises the media gateways (MGW) which establish the media path on which contents is transported in the core network 102. While in FIG. 1, the media path is schematically shown to extend from the last MGW directly to To or Tt, it should be clear that in an actual network architecture, the signalling path may pass through one or more nodes in the access network such as the access network controller (ACN), e.g. through a base station controller (BSC) and a base transceiver station (BTS) in a GERAN.

The Originating access gateway (O-AGW 110) initiates the connection request with a set-up message towards the first node N1 in the signalling path. This connection message can be a BICC-IAM, ISUP-IAM or the like. In the set-up message an information element, e.g. in form of a subscription flag-byte as mentioned above, is included. In it simplest form, it contains flags for subscribing read and write access for A and B channels. The flags can be denoted as Ar (read access to A-channel), Aw (write access to A-channel), Br, and Bw. A node wanting to subscribe to the Media Plane sets one or more flags when the set-up message is send in forward direction along the signalling path. When a flag is already set, thus indicating an access need to the media plane, then the node does not change it. The information element thus accumulates the access needs of all enabled nodes in the signalling path. As mentioned above, other implementations of the information element are also conceivable.

Figure 3:
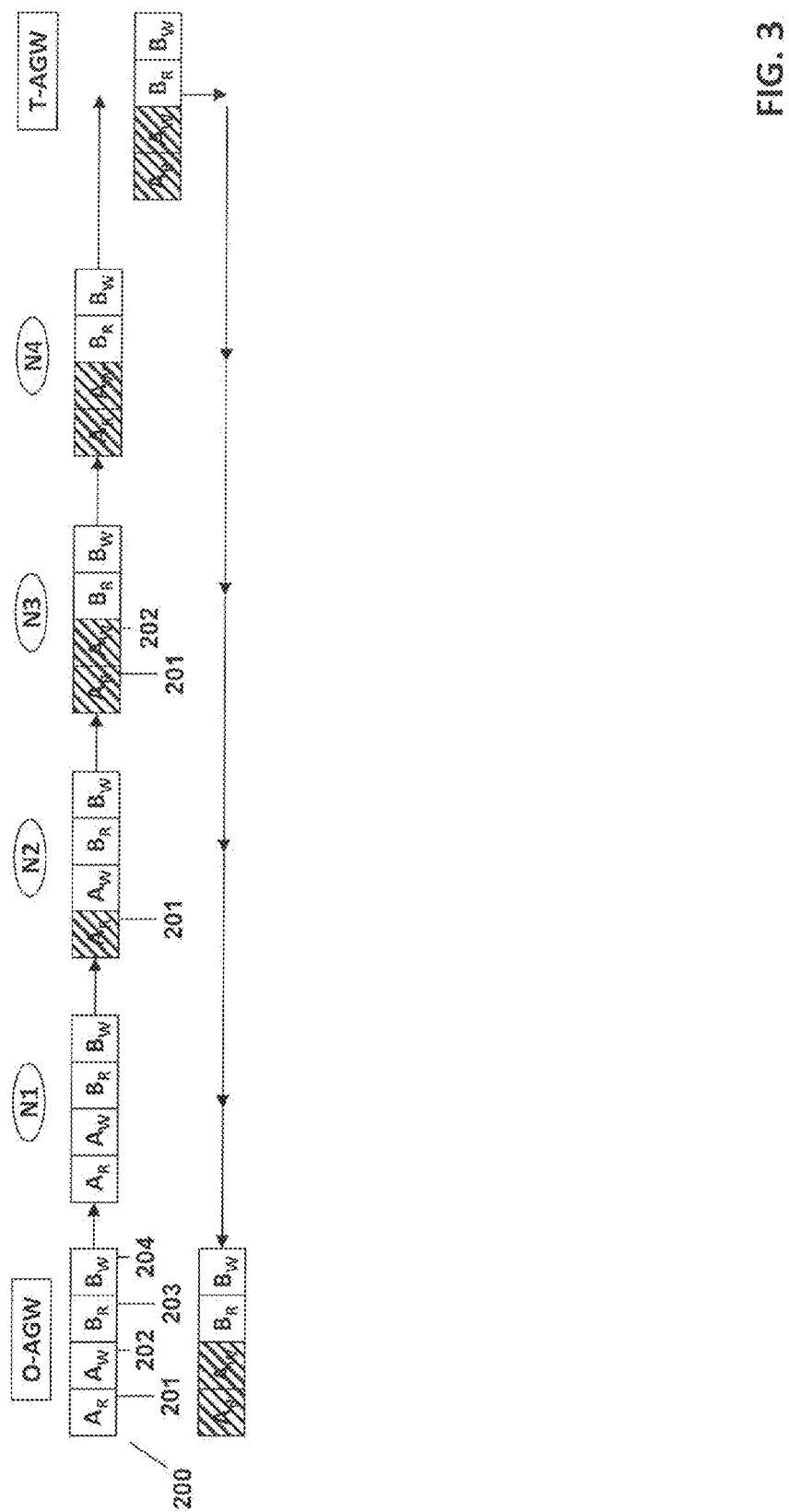
FIG. 3 schematically illustrates an information element according to an embodiment of the invention and its transmission on a signalling path through the core network.

The flag byte example is illustrated in FIG. 3, which is similarly applicable to the scenario of FIG. 2. In the example, the O-AWG includes the information element 200 comprising the flags 201-204 in the set-up message. The O-AGW has no access needs and accordingly does not raise any flags. By not raising any flags, it enters the information into the information element that it has no needs to access the media plane. N1 receives the message and does also not set any flags. N2 sets the Ar flag 201 (as indicated by stripes), indicating a need to read the forward channel. N3 sets the Aw flag 202 and also wants to subscribe to Ar, but that flag 201 is already set so it is left that way. N4 sets no flags but Ar and Aw are already set. Arriving at the T-AGW the flag byte as assembled is copied into the connection response message (like an ISUP-APN) and follows the signalling path in opposite direction. If the T-AGW has any access needs, it also enters that information into the information element before or after copying it.

The nodes do not touch the flags anymore when the information element is transmitted in the opposite direction, but they can copy the accumulated result for own purposes (if wanted). So each node in the signalling path can obtain information on the access needs of all other nodes.

When the response message comes by, then each node sets the MGW context and links for the media path in some embodiments. The nodes may for example set up the A-channel when receiving the set-up message and may set-up the B-channel when receiving the response message. By means of the set-up and response messages, the addresses of the receivers of the MGWs in the media path can be exchanged, allowing the configuration of the MGW transceivers with the receiver addresses for the respective media channel. In other embodiments, e.g. fast track, MGW context and links may already be set up when the set-up message is received. Receiver addresses may then be exchanged by means of inter node signalling, e.g. one node in the signalling path informing an adjacent node of the receiver address of its associated MGW. Media path setup can be accelerated in such embodiments. Finally the flag byte arrives at the O-AGW. The o-AGW and t-AGW can now decide on a short cut or inform the access network controller that it can assign a short cut. The final decision to establish a shortcut and the setting up of the short cut can be made by the ACN, as it then has all the necessary information available for making such a decision.

The above methods can be performed in an environment in which all nodes in the signalling path in the core network are enabled according to the invention, i.e. are capable of processing the information element by entering their own access needs and may further be capable of using the information provided with the information element for configuring the media path in accordance with an embodiment of the invention. The following options may be applied in situations in which the absence of legacy nodes (not enabled nodes) in the network can not be guaranteed, i.e. in which a legacy node may be present in the signalling path through the core network(s).

A legacy node not upgraded for subscribing to media may still require access to media content, but it would not be able to signal that. One possible solution to this problem is e.g. the addition of an node identification (Node-ID) field to the information element (e.g. flag byte). An enabled node overwrites the ID field with its ID before passing it to the next node in the signalling path. The next enabled node checks if the ID in the ID field matches the ID of the node from which it receives the set-up request message (message originator ID, same ID as where to send later the response to). If not matching, then a not enabled node was in between. The node then sets all flags (Ar, Aw, Br, Bw), irrespective of its own wish to subscribe or what it received so far. In this way legacy nodes are treated as if they need full access to the media plane.

Another possibility is the use of selective areas in the connection set-up message. Some areas are copied by each node as they contain information for all nodes in the signalling path. This typically contains information as Global call reference, charging information for CDR's (charging data records) etc. The information element (e.g. the flag byte) can be provided in such an area of the connection set-up message. Another type of area is an area that contains options. Example is media coding, supported CAMEL etc. Nodes will typically remove or adapt information in such an area as they do not always support the option. The information element can be included in such an area of the set-up and/or response message. Entering e.g. a flag byte in such an area would cause a legacy node to remove the flag byte as a not supported option. The presence of the legacy node in the signalling path can thus be detected. This method can detect legacy nodes in most cases. In a particular example, the flag byte is masked as a certain type of non existing media coding. If a legacy node is present in the signalling path, the flag byte is not returned in the response message and T-AGW, and nodes 4-1 and in the end O-AGW will recognise that a standard media set-up may be required and that short cutting may be infeasible.

It will be readily recognized that these methods of legacy node detection will work similarly well with information elements other than a flag byte, e.g. with a list comprising separate access needs and node identifiers.

Figure 13:
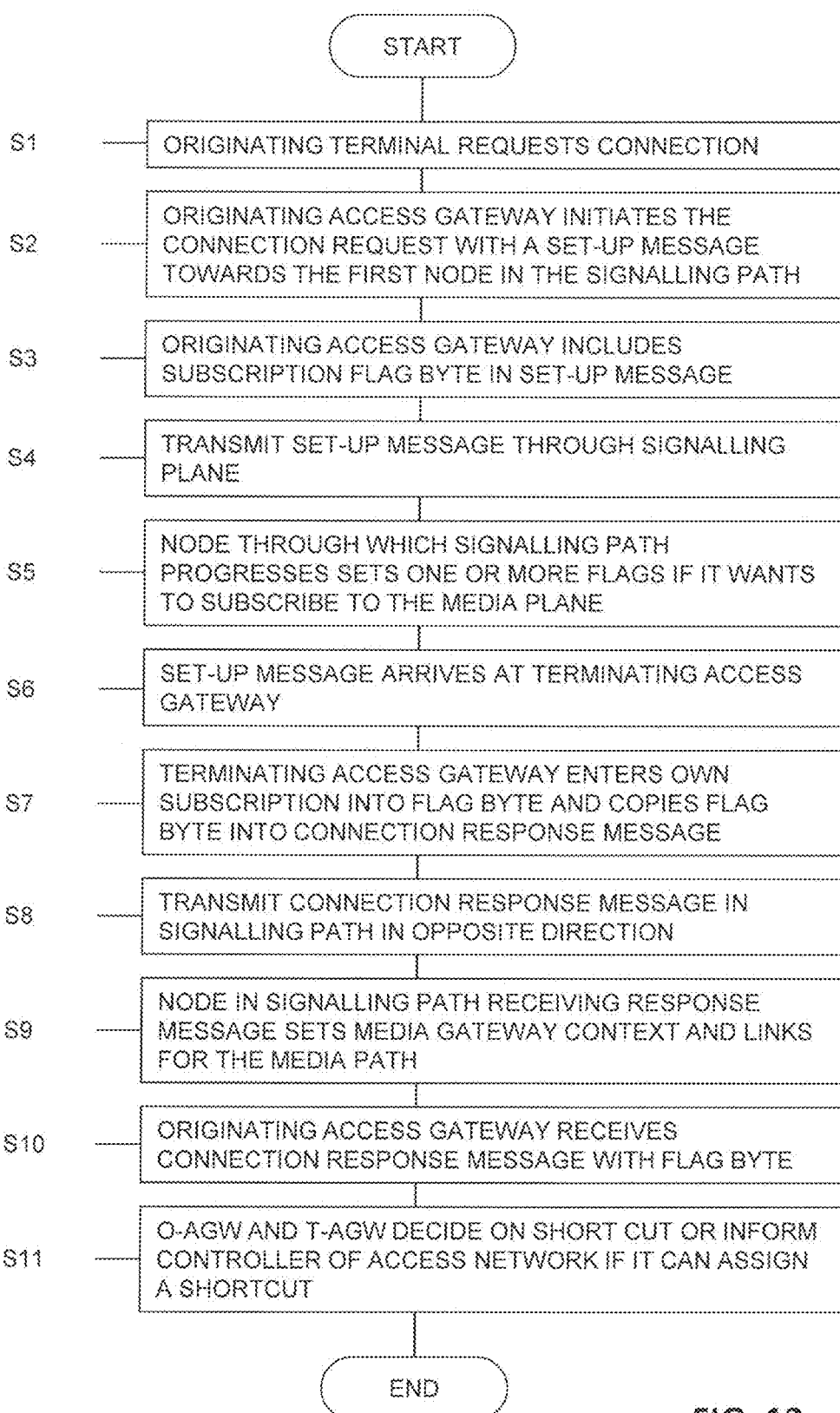
FIG. 13 is a flow diagram illustrating a method according to an embodiment of the invention.

The steps of an particular embodiment of the above described methods are illustrated in the flow diagram of FIG. 13. The originating terminal To requests a connection in step S1. The originating gateway O-AGW 110 initiates the connection request with a set-up message towards the first node N1 in the signalling path in step S2. In the set-up message, the originating access gateway includes a subscription flag byte (step S3). The set-up message is transmitted through the signalling plane, i.e. along the signalling or routing path (step S4). Nodes in the signalling path which receive and transmit the set-up message set one or more flags in order to subscribe to the media plane if they have corresponding access requirements (step S5). The set-up message arrives at T-AGW 120 in step S6, which enters its own access needs in step S7 and copies the flag byte into a response message. The response message is transmitted in the opposite direction along the signalling path (step S8), with nodes in the path configuring their MGWs in accordance with the received information (step S9). The O-AGW 110 receives the connection response message with the flag byte in step S10. The O-AGW and T-AGW can now decide on a short cut or inform the ACN of the access network 101 if it can assign a shortcut, e.g. by transmitting the collected information on media plane access requirements.

In the following, the configuration of the media path will be explained in further detail with respect to FIG. 1.

The basic detection method (hot standby) will still provide a full active media path through the core network. It is up to the AGW's 110 and 120 and the ACN to make use of it either fully or not or of just one channel, i.e. to determine over which channel media contents is transmitted. This determination is made in accordance with the media plane access needs collected with the information element. A "heart beat" signal can be used on the Media Plane for not used channels to prevent the MGW's from detecting disconnect. Depending on the actual channel usage, a heartbeat may be send from O-AGW to T-AGW on the A-channel 151 of the media path or from T-AGW to O-AGW on the B-channel 152 of the media path. As there may be not upgraded nodes (legacy nodes) in the path, an inhibition of traffic detection in the MGW's should not be performed here in order to prevent a disconnect of these nodes.

"Hot standby" has the advantage that when changes in the general media context occur, the media path is still there and can be used immediately with spontaneous WRITE access. Spontaneous Read Access is more difficult to detect.

However, if the first node or any other node would subscribe (e.g. N1 would subscribe to A path), the A path will extend fully through the core network even when no other node has subscribed. In order to minimize the usage of not required resources, the further embodiment may be used.

A further method for configuring the media plane is the "cold standby". A problem is that a node knows from receiving the flag-byte that none of his predecessors in the signalling path have subscribed but not if later nodes in the path will subscribe. To solve this problem, the "forward" flag-byte (in the set-up message from O-AGW to T-AGW) is copied to the response message. Further, an additional information element is included in the response message. As an example, a "backward" flag byte can be added by the T-AGW. Nodes in reverse path do not touch the forward flag byte, but do enter information on their respective media plane access needs into the backward flag byte in the same way they previously did with the forward flag byte. In addition each node has saved a copy of the forward flag byte as received. When the response message arrives, the Node has now information available on the subscription of upstream and downstream nodes and can thus set the MGW for a media channel to active or passive. This basically means that it will not forward media content further upstream or downstream when no node upstream has subscribed for write access and no node downstream has subscribed to read access. When arriving at the O-AGW, these two flag-bytes will be identical.

As mentioned above, in some embodiments, the initial link setup in the MGWs is done in the signalling direction. If there is Out-of-Band Transcoder Control Negotiation (OoBTC), then the Media Plane is anyhow defined after the backward APM is received. This means that for the forward channel, settings have been made but the setting for the context manager in the MGW may need to be changed. For the backward channel this is no problem as the assignment of links is done on arrival of the response message. In other embodiments, both channels may be set up upon arrival of the set-up message, so the setting for the context manager in the MGW may need to be changed for both channels.

The action to be performed simply relates to the saved forward and received backward flag byte. An initial setup of the MGW can be performed upon receiving the forward flag byte, indicating the access needs of the preceding nodes in the signalling path. When the backward flag byte is received with the response message, information on the access needs of the succeeding nodes in the signalling path is available, so that the connection setup can be finalized. If the information elements (here the forward and backward flag bytes) evaluated at a node indicate that there is no need for transporting media downstream a particular channel, the node is an end point for the respective channel. This may for example be the case if no nodes upstream the respective channel have a need to write to the channel and if no nodes downstream the respective channel have a need to read the channel (if a node upstream the channel needs write access, contents generated by that node should be transported downstream the channel so that it may be merged into the shortcut media stream). It can then set the respective MGW link to passive, as no media contents needs to be transported on the link. It can transmit the heartbeat signal instead.

As an example, each inner node sets the context manger in its MGW for upstream based on the forward flag byte (transmitted from O-AGW to T-AGW) and vice versa. For the B stream it will be the saved forward flag byte indicating that any node downstream B has subscribed to it. For the A stream it will be the backward flag byte showing any nodes downstream the A channel having subscribed. In case write access is required on any channel, a node may make use of both flag bytes to determine if the link for that channel is set to active or passive. If request (i.e. media plane access needs) have been set requiring the transport of contents in a particular direction, the media path is extended fully to the next MGW in that direction. If not, then this MGW is an end point for the respective channel. Content received is not further sent down. Instead a heartbeat signal is sent down stream to keep the path alive. Note that an MGW can be an end point for the A-channel or the B-channel or both. Each MGW is so responsible for keeping its link downstream a particular channel to the next MGW alive.

Note that downstream the B-channel, which runs in reverse direction to the A-channel, corresponds to the "global" upstream direction, i.e. the direction from T-AGW to O-AGW.

As an example, node N2 of FIG. 1 is informed by the forward information element that the upstream nodes N1 and O-AGW have no media plane access needs. By the additional information element received with the response message, N2 is informed that downstream nodes, i.e. one of the nodes N3, N4 and T-AGW, has read and/or write access needs for the A-channel, and that none of these nodes requires access to the B-channel. As downstream the A-channel, media plane access is required, N2 controls its MGW to transmit contents on the A-channel link to N3. As downstream the B-channel (in direction of N1 ), no access requirements exist, N2, sets the B-channel link to N1 to passive, e.g. it initiates the transmission of a heartbeat signal instead of media contents. As no node has subscribed to the B-channel, all B-channel links in the core network 102 can be set to passive.

In the "cold standby" embodiment, resources (like links and context managers) are still actual assigned and can not be used for other purposes. The advantage is that they are reserved and can be activated rather safely by the signalling plane, i.e. by the respective control nodes. Similarly, the "Hot Standby" also needs Signaling Plane support for READ access.

A further embodiment, the "reduced media path", makes it possible to free these resources. The implementation of the "reduced media path" is a further enhancement on the "cold standby". The same flag byte principle for up and down stream can be followed. Only now, if the node detects that it is an end point and has subscribed, it will assign a context manager but no downstream link. Any downstream node detecting that it is an end point and not having subscribed, i.e. not having any media plane access requirements, will not assign a context manager as their will not be an incoming upstream link. And of course such a node will also not establish a downstream link.

For the B stream this can be done upon receiving the response message. For the A stream, resources may first be set-up (with the received set-up message) but are discarded with the received response. A late set-up of the media path may avoid this. In other implementations, both channels may be set up when receiving the set-up message, and accordingly, links for both channels may need to be removed if there are no access needs downstream the respective channel.

As the links are not setup, resources can be freed. When a change in general context occurs the setting up of additional paths may be required. In the "reduced media path" configuration, the media path may extend through nodes (more precisely through their MGW's) that have not subscribed to the media plane. As an example, if N2 has subscribed to the A-channel but N1 has not, the media path will still extend through the MGW of N1 for the A-channel. This will occupy resources (like links and context managers) that can not be used for other purposes. With the following embodiment ("Adaptive media routing"), those nodes may be bypassed and media links may only be created between nodes that have subscribed.

This embodiment uses a different information element then the simple flag byte. Each enabled node in the signalling path adds its flags (i.e. enters its media plane access needs) and its node identifier (id) to a dynamically growing list. So the connection set-up signalling is assembling a downstream list of all enabled nodes with their subscriptions.

Like the previous implementation, the list received with the set-up message (which only comprises the access needs of upstream nodes) can be used to set up part of the media path (e.g. initialize media context), while the list received with the response message, which also includes the access requirements of downstream nodes, can be used to finalize the set-up of the media path (e.g. complete the set up of media context and links). If the list indicates that there is no need to transport media contents to the MGW of a particular node in the signalling path, the media path is set up so as to bypass this MGW.

As an example, A-stream links may be initially set up and may be altered when receiving the list with the response message. In other embodiments, A and/or B-stream may be initially set up but need to be adapted with the response message comprising the completed list of access needs. In order to make correct media connections, the list may comprise the port/gate identification of the context manager for the different flags (or channels) in order to correctly establishing the link. Presence of the identification means having subscribed. As multiple links are present and connecting does not include the signalling request/response message, the global call reference can be used to identify the correct relation. The port/gate ID can correspond to "Global IP (internet protocol) address and UDP (user datagram protocol) Port Number" per direction.

Figure 14:
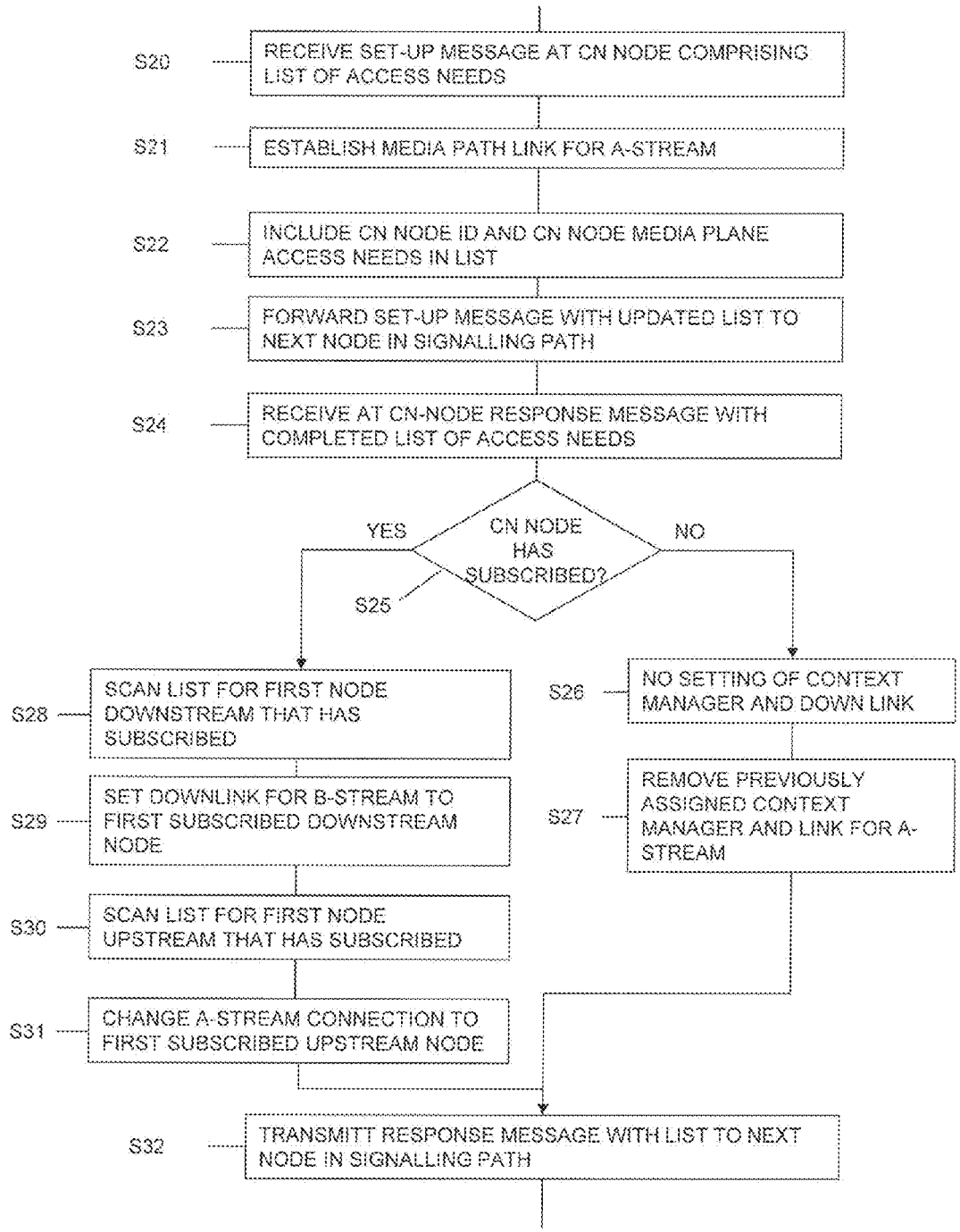
FIG. 14 is a flow diagram illustrating a method according to an embodiment of the invention which is performed at a core network node.

The steps performed by a node of the core network in the signalling path are illustrated in the flow diagram of FIG. 14. The set-up message comprising the information element with the list of access needs is received at the core network (CN) node in step S20. The CN node establishes the media path links/connections for the A-stream/channel in step S21. As noted above, fast track or late setup of the media path is also conceivable. The CN node enters its ID and its own media plane access needs into the list (step S22) and forwards the set-up message with the updated list to the next node in the signalling path (step S23). A response message transmitted by the T-AGW and comprising the completed list is received by the CN node in step S24.

For the B-stream, the node performs the following steps. When the response message arrives, the CN node will refrain from setting context manager and down link (step S26) when it has not subscribed (decision step S25). If it has subscribed (step S25), it will scan the list stored from the request message for the first node downstream that has subscribed (step S28). Then it will setup the downlink to that ID (or modify a previously assigned link correspondingly) rather then following the normal signal routing (step S29). The alternative is that a downstream node having subscribed establishes the connection to the first upstream node in the list that has subscribed and uses the port/gate identification together with the ID.

If the A stream was previously set up, the procedure is slightly different. A node not having subscribed (decision step S25) simply removes the context manager it has previously assigned (step S27). When it has subscribed a check is made in the B stream assembled list of the first node upstream that has subscribed (step S30). The connection (i.e. the media path link) is then changed from the first uplink node to the first one having subscribed (step S31) using ID and port gate information. Also here, late set-up of the media channel would ease this, as already established links do not need to be modified.

The CN node finally forwards the response message with the information element to a next node in the signalling path. This may of course also be performed at an earlier stage in the method, e.g. directly after receiving the response message.

Whereas the description of the above embodiment comprises the setting up of the A-channel with the set-up message and the B-channel with the response message, the explanations are similarly applicable to a fast track setup of the media path. Both the A-channel and B-channel links established with the set-up message may then be removed (steps S26 or S27) or adapted (Steps S29 and S31) in accordance with the media plane access needs in the list received with the information element of the response message.

With respect to FIG. 1, if N2 has access needs and the list indicates that N1 does not have any access needs, then N2 sets up the media path link of its associated MGW directly to the MGW of the O-AGW. The media path thus bypasses the MGW of N1.

In some embodiments, an MGW is only bypassed if there are no access needs for any of the A and B channels, i.e. an MGW is not bypassed only for the A or the B-channel. The media path is thus the same for the A-channel and the B-channel. Other embodiments in which the A and B channel may take different paths are also conceivable.

Legacy node in the signalling path may be dealt with as follows. Like in previously described implementations, the first downstream enabled node detects the presence of at least one non enabled node, from which it receives the set-up message. As a matter of precaution, the enabled node subscribes to both streams so it can provide/receive media content of both channels to/from the non enabled node. The node preceding the legacy node (in downstream direction) may similarly fully subscribe to all channels. This way, two enabled nodes will create a normal path through one or a series of non enabled nodes, the path having an enabled node at each end (i.e. the media path is created through the MGWs of these nodes). Nodes having subscribed for this purpose remember this and do not apply rerouting, but establish connections (i.e. media path links) as usual to the adjacent non enabled node.

Enabled nodes in the signalling path may be informed of the presence of a legacy node in the path as follows. The node (e.g. N3 of FIG. 1) detecting the legacy node (e.g. N2), for example by noticing that the legacy node N2 has not entered any information into the list of access needs, may enter this information into the list. When the response message arrives at the node N1 preceding the legacy node N2 in downstream direction (i.e. the node from which the legacy node receives the set-up message), it can determine from the list in the response message that the next downstream node N2 is a legacy node and establish the full media path links to this node. Nodes further upstream also receive the response message and recognize that N1 requires full media plane access as it connects to the legacy node N2. Accordingly, the media path will be established between the next upstream node which has subscribed, and then through N1 to N2 and to N3. From there, the media path continues in accordance the adaptive routing scheme. It should be noted that the connections between nodes mentioned above refer to media links between the respective associated media gateways.

With the adaptive media routing, the MGWs of nodes not requiring media plane access can be bypassed, leading to a reduction in traffic and required resources. Note that the adaptive media rerouting may also be performed if the information collected with the information element indicates that a local shortcut is not possible, e.g. if nodes in the signalling path have write access requirements.

The adaptive routing is also possible in case both terminals are not in the same access network. Adaptive routing is therefore a very powerful method of optimizing a media path. Any node in the signalling path can act as O-AGW or T-AGW and can include an information element in a set-up or response message that is forwarded by the respective node. Nodes in the signalling path capable of processing the information element can thus make use of it in any of the above described manners in order to set-up the media path.

As an example, the injection of the information element can be done by the Terminating AGW albeit the response message is not generated by that gateway, but only forwarded. It can enter an information element copied from a previously received set-up message into a response message passing by and not comprising the information element. Similarly, a node in the path that is not the O-AGW can act as an O-AGW by including the information element into a set-up message which passes by and which does not already comprise such an element.

Basically any node in the signalling path that detects in the set-up message that the information element is not present can inject it, like any node that sees in the response message no returned information element may insert his local stored copy from the set-up message. This means that also parts or sections in a network, e.g. a chain of nodes of the signalling path, can make use of the information element for optimizing media path.

FIG. 2 illustrates a different scenario in which the access network is a core network of a first operator, in which a local shortcut may be possible. The explanations given above similarly apply to the scenario of FIG. 2, with the nodes of core network 102 performing the above methods.

The scenario of FIG. 2 can illustrates a call forwarding over a border. The calling party (or A party) with the terminal To is roaming in the network of operator 1 (i.e. access network 101). To can connect via a radio access network (not shown) to access network 101. Traffic over the border between the network of operator 1 and of operator 2 is established by means of an international gateway exchange (IGEX) on each side of the border. The IGEX in the access network functions as a access network controller and may establish a shortcut of the media path between To and Tt, both of which also connect via the access network 101. The IGEX in the core network functions as a combined O/T-AGW and O/T-MGW. For operator 2 the network of operator 1 is seen as an access network. Operator 1 could also be an internet telephony operator, and the IGEX may then be an IGW (Internet Gateway).

In the example of FIG. 2, the terminal To calls the party Ti, the home network of which is the core network 102. In node N2, a call forwarding to Tt for calls received for Ti is provided. The media path is thus established through core network 102 back into access network 101, and from there to Tt. The above methods, e.g. regarding the collection of access requirements of nodes in the routing path and the configuration of the media plane may thus similarly be performed in core network 102.

If the forwarding node N2 makes an announcement towards To that his call is forwarded then that voice message uses the return media path to To. It is thus advantageous to already set up the full media path (fast track). N2 may need interactive input of To for call forwarding, e.g. if To will accept additional charges of the forwarding leg of the call. Core network services generally benefit from a full duplex media path established to the Originating terminal. To support faster set-up and thus enable interactive services, the down stream node receiving a set-up can directly contact his immediate upstream node and inform it of his media receivers, and possibly available coding means for the contents on the media channel (inter node signalling). The full media path can thus be established at call setup.

In general, it is possible that a node needs read/write in the set-up phase and does not need it when the call is established. The node can enter its access needs into the information element (e.g. the flag byte or flag list) when the set-up message leaves the node (so the service has already been applied). The entering of information corresponding to the situation when the message enters the node can thus be avoided.

An even more complex case is what is called back to back service. An example is a collect calling. The call is not set-up to the Tt terminal but the call first ends at the service leg To-S, the service then calls the Tt and asks for acceptance of the charges. If Tt accepts then the service joins the To-S and S-Tt legs of the call to one path To-Tt in which a shortcut could be applied.

A persons skilled in the art will know how to modify and adapt the above basic teachings to such specific cases.

Figure 15:
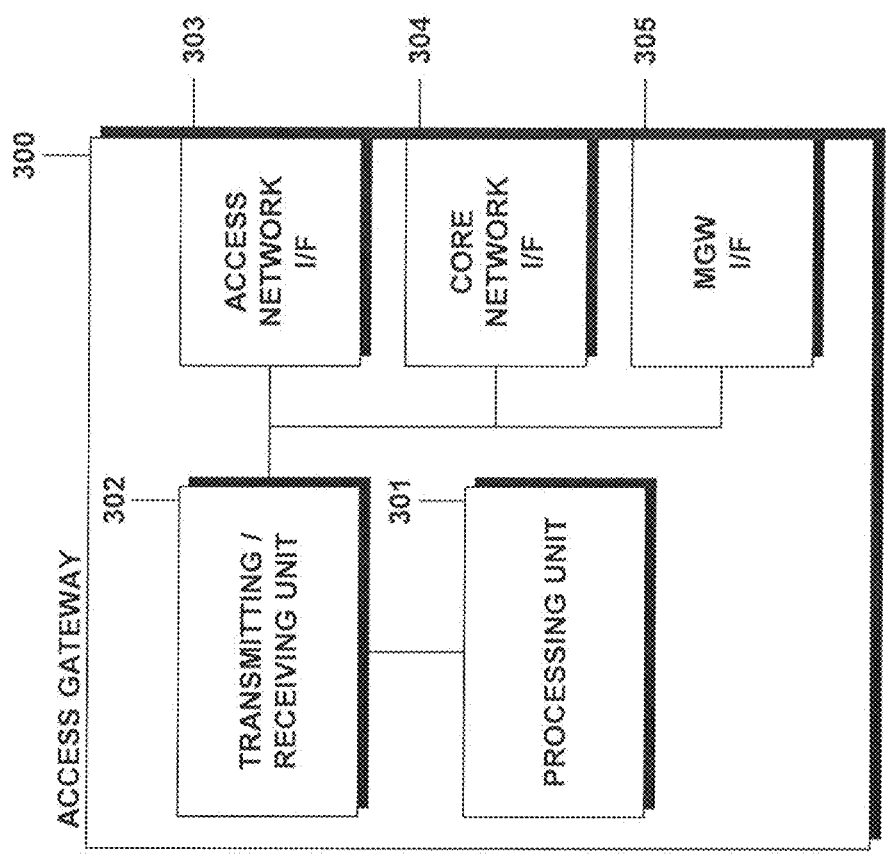
FIG. 15 schematically illustrates an access gateway according to an embodiment of the invention.

FIG. 15 shows a schematic block diagram of an access gateway according to an embodiment of the invention, which can be used in any of the above configurations. The access gateway 300 can be configured to perform any of the above method steps described herein with respect to any type of access gateway. The access gateway controls an associated media gateway via the MGW interface 305, e.g. for setting up a media path through the core network. It may thus also perform any of the steps mentioned herein with respect to the establishment of the media path. The access gateway 300 further comprises an interface 303 towards an access network, in particular towards a control node of such a network. examples include an interface towards a base station controller, a radio network controller or an eNodeB of a radio access network or an interface towards a gateway of another core network, e.g. towards an IGEX of another operators network.

Access gateway 300 further comprises the core network interface 304 towards nodes in the core network. It may for example interface another access gateway in the core network or any other control nodes of the core network controlling media gateways. It may also interface any other types of nodes as known in the art, such as a VLR or the like.

Transmitting/receiving unit 302 of access gateway 300 transmits and receives connection set-up signalling and other types of signalling over the interfaces, e.g. control signalling towards the MGW via interface 305. Processing unit 301 is adapted to control the operation of access gateway 300 for performing the method steps mentioned herein. In particular, it can include the information element in a set-up message or response message to be transmitted via interface 304 and it may retrieve an information element from such received connection set-up signalling and provide the collected information for a determination whether a shortcut can be established. It may itself evaluate the information. It further controls its MGW in accordance with the retrieved information for establishing the media path, as outlined above.

The core network (CN) node 400 illustrated in the schematic block diagram of FIG. 16 is similarly configured with an interface 403 towards core network nodes and an interface 404 towards the associated media gateway. Transmitting/receiving unit 402 transmits and receives connection set-up signalling and control signalling via the interfaces 403 and 404, respectively. Processing unit 401 is adapted to control the CN node 400, e.g. by letting the node perform any of the method steps mentioned herein with respect to core network nodes. In particular it can extract and store an information element from received connection set-up signalling, enter its own media plane access needs into such an information element and forward connection set-up signalling including the information element via interface 403 to other CN nodes. It may further configure the media path through its associated MGW by control signalling on interface 404 according to any of the above embodiments and implementations.

In the following, specific examples of possible implementations of the invention are described. It should be clear that the explanations given above can be applied to the more specific implementations described hereinafter.

An example architecture comprises terminals in form of mobile phones, access networks in form of radio access networks (RANs) and access gateways in form of mobile switching centers (MSCs). In general, a scenario for mobile-to-mobile calls can include an originating Radio Access Network (oRAN: it originates the call), an originating Core Network (oCN: with one, two, three or more MSCs and one or several MGWs), maybe a Transit Network (TN: any complexity), a terminating Core Network (tCN: as in oCN) and a terminating Radio Access Network (tRAN). For providing a local shortcut in the access network, oRAN and tRAN should be identical, they should at least allow the Local Shortcut. oRAN and tRAN may be logically different and may be controlled by different network operators who share the same physical RAN. In many cases only one MSC and only one MGW will be present, but the method can be applied to any number of nodes in the path. The method also has the capability to work with more than one Core Network and with any number of Transit Networks in the path (provided they are all upgraded to work according to an embodiment of the invention).

The first problem to be solved is to identify that the two radio legs (the one from the originating Mobile and the one to the terminating mobile) belong together to one call. Otherwise, no local shortcut is allowed. This problem can be solved by using a unique Call Identifier that is passed along the routing path from originating side to terminating side. According to an aspect, it is possible to route the call in any arbitrary way on this globe and therefore a true "global" Call Identifier is used. The "Global Call Reference" existing already in 3GPP may be reused for this purpose.

Furthermore, it is negotiated along the call routing path that any node in the path allows the local shortcut. If a single node within the routing path is not agreeing to the local shortcut (either because it really has needs to access the User Plane (i.e. Media plane) or because it just does not understand the new procedure), then the Local Shortcut may not be established.

In the present implementation, several flavours of a Local Shortcut are differentiated, combined with the different access needs within the Core Network:

a) the call is directly shortcut and the User Plane through the Core Network is not at all present. Then no access to the User Plane is possible, no Supplementary Services are possible—unless the Shortcut is broken and the normal User Plane is established. This version has substantial improvements in terms of User Perception (high quality, low delay) and operational costs. This type of shortcut may be used in most calls and most of the time.

b) the call is directly shortcut, but the User Plane data are still copied in uplink (e.g. forked), such that any node in the routing path can read the User Plane data. Subversions of this "read" functionality are that either the originating side uplink is copied or the terminating side uplink is copied or both are copied. Media contents can thus be transmitted on one or both channels of the media path through the core network(s), depending on the access needs of nodes in the path.

c) the call is directly shortcut, but any node in the routing path can write to the User Plane and these data are send to the mobile. Subversions of this "write" functionality include writing towards the originating Mobile or towards the terminating mobile or to both. During this writing time, the Local Shortcut is broken to feed the written data to the mobile.

The solution according to the present implementation can allow controlling all these cases with rather efficient means. At call setup, the first originating MSC (oMSC) generates the "Global Call Reference" (GCR) and an Information Element called in this implementation "Need_Read_Need_Write" (NRNW), which comprises four binary flags:

a) Need_Read_Forward: 0: No, 1: Yes
b) Need_Read_Backward: 0: No, 1: Yes
c) Need_Write_Forward: 0: No, 1: Yes
d) Need_Write_Backward: 0: No, 1: Yes The oMSC sets these four flags within the NRNW according to its needs; default is: all four flags are set to "no", which maps to the binary "0" value. The oMSC sends the GCR and the NRNW forward to the next call routing node, i.e. the next node in the signalling path. This node (any node in the path) may modify these four flags according to its needs: The nodes are configured to never reset a flag from Yes to No. They may raise any flag from No to Yes.

The potentially modified NRNW is send forward along the routing path to the next node, until it reaches the tMSC, which may also raise one or all flags to Yes (same rules). At the end, these four flags represent the logical OR function of access needs of all the nodes along the path. In general the NRNW is send backward along the routing path; this time no modification is allowed. At the end, all Call Control Nodes in the path know the status of the User Plane access needs, i.e. whether read access or write access is wanted/possible and in which direction (forward or backward).

The tMSC (and potentially also the oMSC) inform(s) the associated tRAN (and oRAN) accordingly. In one possible case, all flags are set to "yes" and the Local Shortcut is totally prohibited. In the best case, all flags are set to "No" and the Local Shortcut is totally unrestricted. All variants in between are possible.

During the call, the needs in any of these nodes may change and they may send a new Message in forward and/or backward direction to update the NRNW Flags. The oRAN and/or tRAN are then informed and the Local Shortcut may need to be modified (Partly or totally allowed or prohibited).

The Information Element (here NRNW) allows in the present implementation the controlling of all possible scenarios for the Local Shortcut and the Supplementary Services at call setup with efficient means. For the modifications during the call, the same Information Element NRNW may be send within an existing Message or a new Message. The change between any variant of the Local Shortcut can be possible at any time.

In the following, an even more specific implementation of the above teachings is described with respect to FIGS. 4-12. The implementation relates to a 2G or 3G network, and in particular to providing a local shortcut in an GERAN access network. The access network is provided in form of a base station subsystem (BSS), which may comprise a access network controller in form of a base station controller (BSC) and one ore more base transceiver stations (BTS) communicating with terminals within their range.

To avoid impacts to the support of various kinds of supplementary services (e.g., Multiparty Call, Explicit Call Transfer, etc.), and the support of Lawful Interception procedures, not only the BSS (base station subsystem), but also the access gateway, e.g. an MSC, can be involved in the establishment/release of the local shortcut (also called local switch in the following, or LCLS). In the present implementation of local switching, i.e. of providing a local shortcut in the access network, the BSS correlates the two legs of the call, i.e. it needs to know who is talking to whom. This information is provided by the MSC.

Local Call Local Switching (LCLS) may have major impacts on the core network regarding allocation of resources on the MGW, potential procedures for MGW removal/insertion, binding into supplementary service control within the core network (e.g. MPTY), Lawful Intercept procedures within the Core Network, Handover procedures, interaction with MSC-S pooling, etc, as mentioned above. The present implementation for local call local switch aims at keeping the core network impact to a minimum, e.g. the impact on the nodal functions, existing call flows, call establishment and call release.

In the following, all nodes on the "originating side" are marked with a preceding lowercase "o", like oMS, oRAN, oMSC, oMGW. All nodes on the "terminating side" are marked with a preceding lowercase "t", like tMS, tRAN, tMSC, tMGW, etc. The same nomenclature applies for all links, messages and procedures, where applicable, like oA(-Interface), oAssignment-Request, etc. The direction of the call setup signaling is called "forward": oMS=>oRAN=>oMSC=>tMSC=>tRAN=>tMS. The opposite direction is called "backward": oMS<=oRAN<=oMSC<=tMSC<=tRAN<=tMS.

Figure 4:
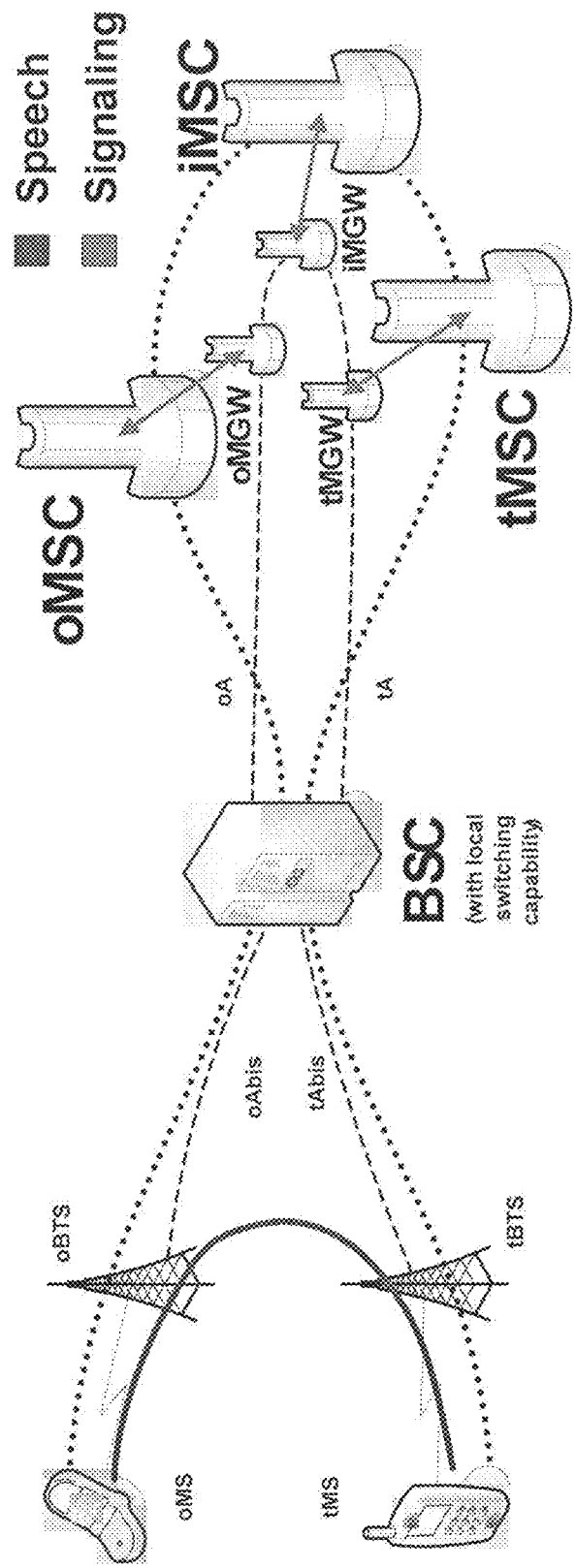
FIG. 4 schematically illustrates a possible implementation of an access network and a core network.

FIG. 4 shows a Reference Architecture for the present implementation. It highlights only the main nodes and interfaces and differentiates between "originating" nodes and interfaces (oMS, oBTS, oMSC, oAbis, oA) and "terminating" nodes and interfaces (tMSC, tBTS, tMS, tAbis, tA). It also includes an Intermediate MSC and MGW (iMSC, iMGW), which may be a (G)MSC (gateway MSC) or other intermediate CN control node and its MGW. BSC, oBTS and tBTS are in the access network, here a RAN. The access gateways oMSC and tMSC and the CN node iMSC are in the core network. The BSC is an access network control node.

The "active" User Plane path (or media path) is shown with a solid line for the case that Local Switching is provided between two BTSes, while the "inactive" User Plane path, i.e. the two Abis-links, the two A-links and the links within the Core Network are not carrying traffic and are therefore marked with dashed lines. The Control Plane (or signalling plane) is shown in a dotted line. Based on this Reference Architecture various call scenarios may be conceived, e.g. with the simplest scenario including just one BTS and one MSC, or a complex scenario including two different BTSes and more than two MSCs.

The following features may be provided for local call local switch: The local call local switch can be made transparent to the end user; The local call local switch may only be considered for CS voice call; The local call local switch may not hinder any supplementary services; Lawful Interception can be supported; The impact on the core network should be kept minimal, e.g. the impacts on the existing call flows, call establishment and call release; The MSC in Pool can be supported.

Figure 5:
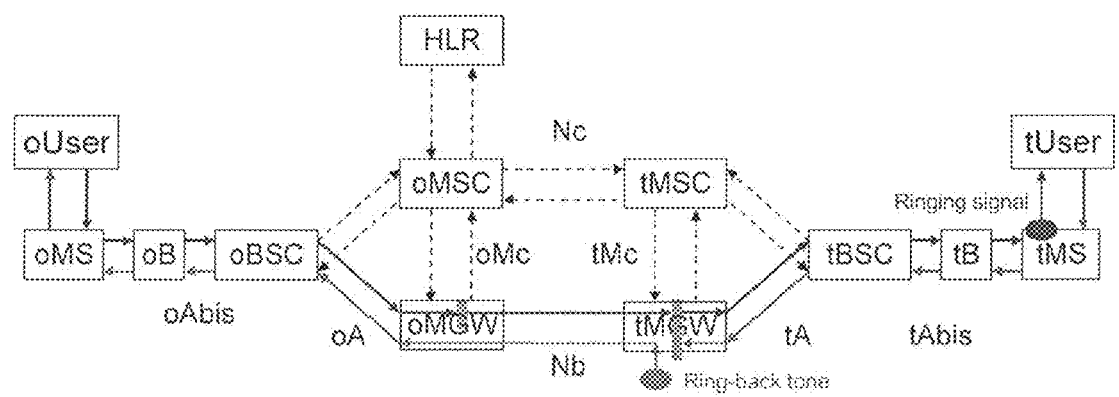
FIG. 5 schematically illustrates the signalling path and media path through a core network having an originating access gateway and a terminating access gateway.

FIG. 5 shows the network architecture for this basic call scenario. Only major signalling links are shown with dashed lines, the User Plane (i.e. media plane) is shown in solid lines. The call scenario here assumes that the "Early Assignment" option is used on both radio interfaces to achieve best possible user perception at call setup. "Late Assignment" is discussed further below.

When the originating User (oUser) triggers the call setup, the oMSC interrogates the HLR (home location register) and finds tUser registered in tMSC. The routing continues to and in tMSC; tMS is paged. Once tMS has responded, the speech path is setup by oMSC sending oAssignment-Request and tMSC sending tAssignment-Request and both MSCs allocating all necessary resources in oMGW, tMGW and between the nodes. The setup of these radio resources takes a considerable time and that's one reason for "Early Assignment". Finally, when the User Plane is setup and ready for traffic, tMS triggers the "Ringing tone" to alert the tUser and informs the CN with an "Alerting" message. At that time tMGW starts to generate on command of tMSC the "Ring-back tone", which is sent backwards through the User Plane down to oMS. Now tUser hears the Ringing tone and oUser hears the Ring-back tone, until tUser accepts the call or oUser terminates the call attempt or another event happens.

FIG. 5 shows the active User Plane and where it is still disconnected during the Ringing phase. Without the interruptions in the speech path (i.e. media path)—within oMGW and within tMGW—the Network could not prevent that modified mobile terminals could setup a one-way or even two-way communication between the Users without accepting the call, i.e. without paying for the communication. Fraud would be possible.

Figure 6A:
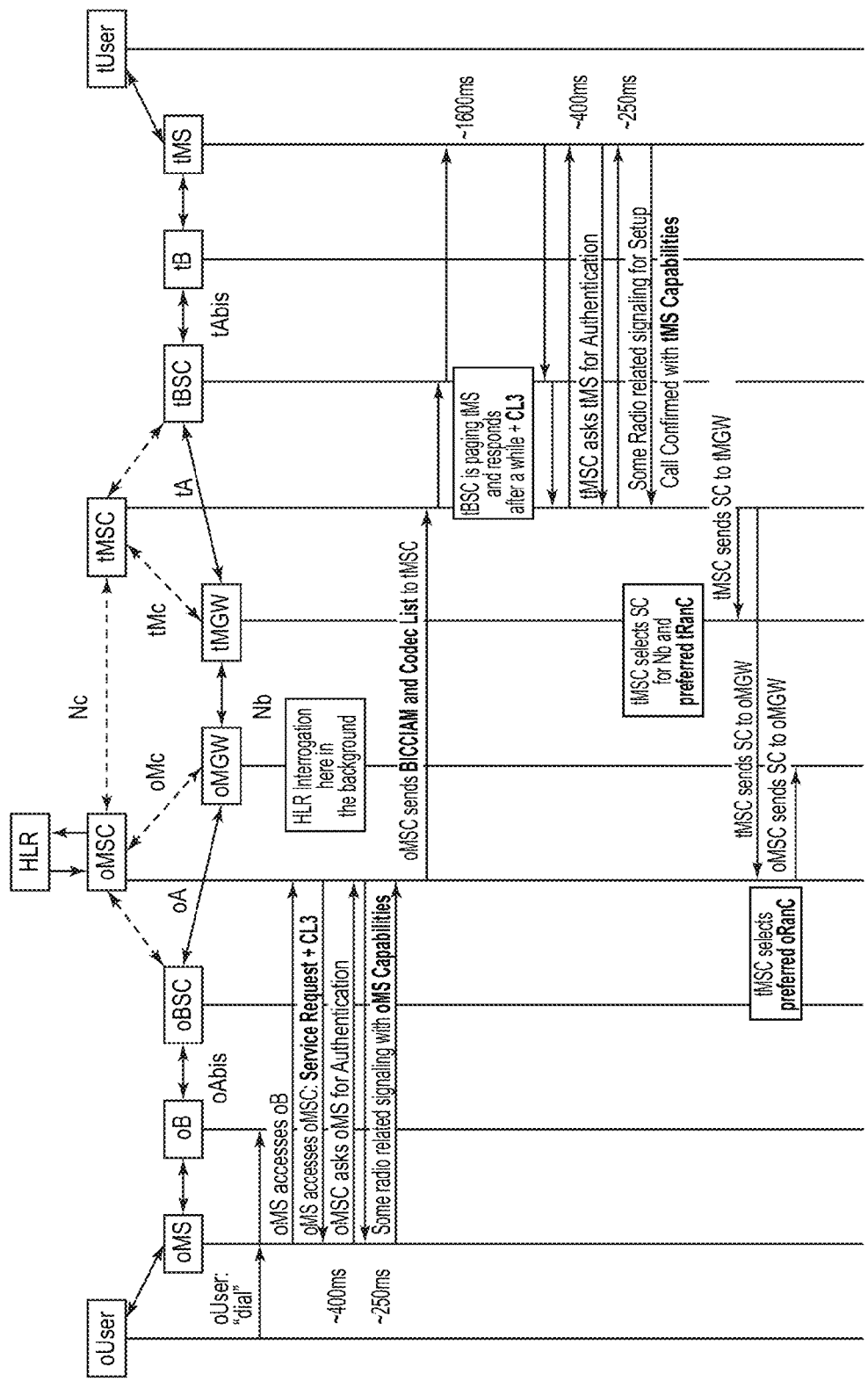
FIGS. 6A-6B are a flow diagram schematically illustrating the signalling when setting up a connection in the network architecture of FIG. 5.
Figure 6B:
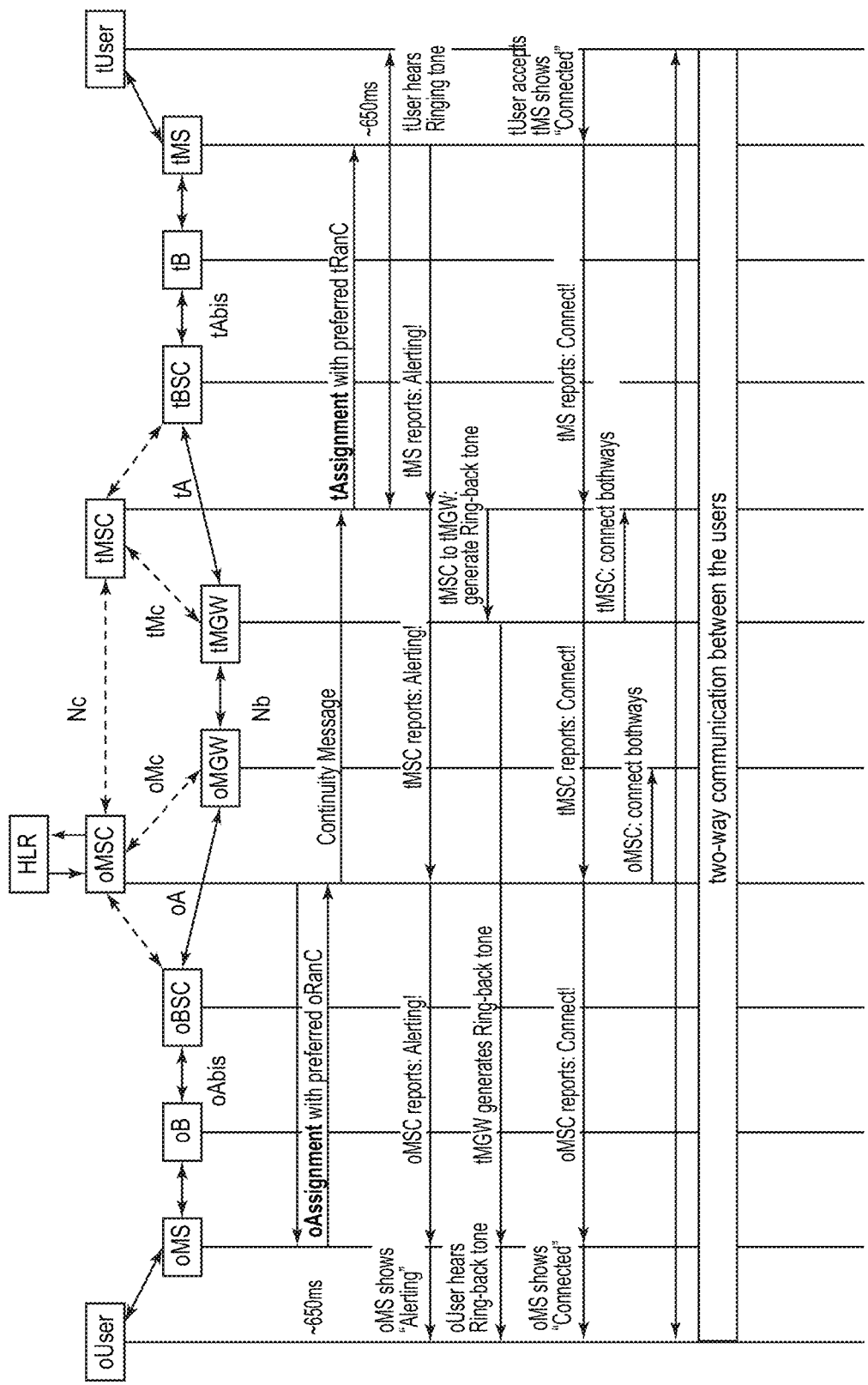

FIG. 6 illustrates the typical Call Flow for this MS-to-MS call with two MSCs with exemplary timings, without LCLS. The OoBTC (Out of Band Transcoder Control) negotiation in this example here is based on BICC (Bearer Independent Call Control); SIP-I (Session Initiation Protocol) would be another valid alternative. Typically, tUser accepts after he hears the ringing, finds his mobile and decides that the call is interesting enough. This may take a considerable time; a considerable amount of calls are never answered.

Note that in the present implementation, the User Plane is already setup and especially the Abis-Interfaces are carrying active traffic, because "Early Assignment" is assumed. So oAbis- and tAbis-Resources are already in use, although User to User communication is still not possible. Now, tUser has accepted the call. tMS informs first of all tMSC by the "Connect" message. Then tMS stops the Ringing Tone, informs tUser with a display message "Connected". tMSC informs tMGW; tMGW stops the Ring-back tone and through-connects the User plane both ways. tMSC forwards the "Connect" message to oMSC. oMSC informs oMGW; oMGW through-connects the User plane both ways. oMSC forwards the "Connect" message to oMS; oMS informs oUser with a display message "Connected". The call is now set up, and the users can communicate in both directions. These "Connect" signalling messages backward from tMS to oMS and vertically to the MGWs (control plane) are in a "race condition" with the User Plane signal from tMS to oMS. If the Control Plane signalling is a bit slow, then the first utterances of tUser are still blocked by tMGW and are lost, i.e. not heard by oUser. Typically the signalling within the Core Network part of the Control Plane and within the landline part of the BSS is fast and "fortunately" the tMGW is reached quite quickly. The User Plane across the radio legs is already setup and is working ("Early Assignment"). There is no further bottleneck in the User Plane and through-connection is quick and comfortable for the Users.

In the following, an LCLS implementation with two MSCs as access nodes is described. The implementation provides a local shortcut under the following conditions. Only if oBSS plus oMSC plus tMSC plus tBSS indicate support and acceptance for LCLS, and if oBSS is identical to tBSS, and if both call legs are identified by the BSS as belonging to one call, then LCLS is provided in this call scenario.

Existing Architecture and Signalling Rel-8 is assumed here, i.e. AoIP-support on the A-Interface Control Plane and OoBTC/BICC or OoBTC/SIP-I on the Nc Interface and the corresponding MGW-Control Signalling on Mc. The oMSC gets in the "Complete Layer 3 Message" the capabilities of the oBSS in "Call Setup Request" per call leg. The tMSC gets in the "Complete Layer 3 Message" the capabilities of the tBSS in "Paging Response" per call leg. The signalling overhead within the CN may be minimized by the BSS informing the CN as early as possible about its capabilities regarding LCLS. The other direction, CN to BSS, seems less critical. These considerations and several options are discussed in detail further below.

Figure 7A:
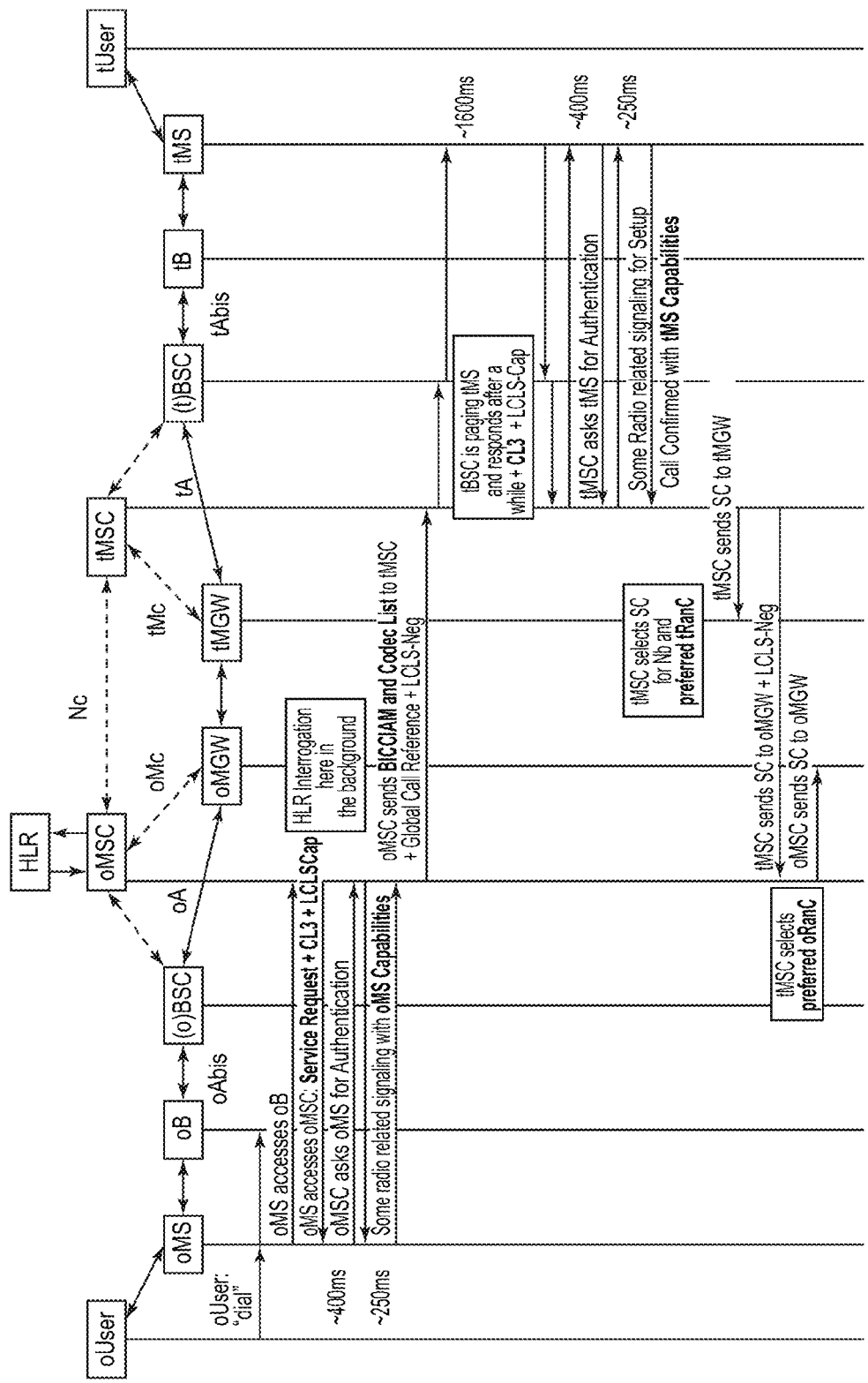
FIGS. 7A-7B are a flow diagram illustrating the signalling when setting up a connection according to an embodiment of the present invention.
Figure 7B:
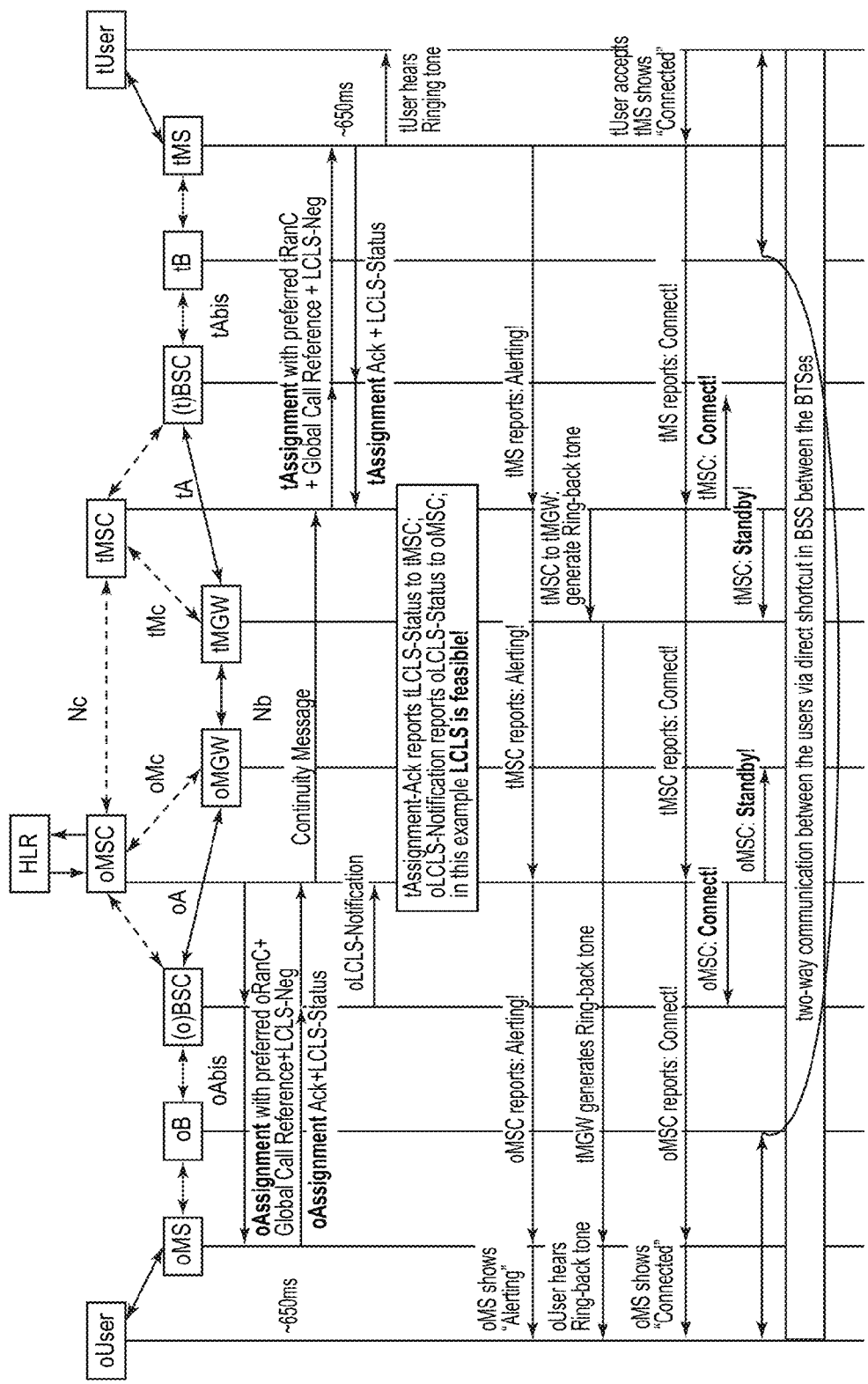

The example call setup is described with respect to FIGS. 7A-7B. It assumes that the BSSes signal their LCLS-Capabilites to the MSCs in both Complete Layer 3 (CL3)messages; The MSCs exchange a "Global Call Reference" within the Core Network to identify the call in all nodes. The MSCs exchange a "LCLS-Negotiation", e.g. in form of an information element, within the Core Network to check if LCLS is feasible. The MSCs send this Global Call Reference and the LCLS-Neg result to the BSS in both Assignment Requests. The (t)BSS correlates the call legs and reports LCLS status in tAssignment Acknowledge to tMSC and the (o)BSS sends a new Message "LCLS-Notification" to oMSC at the same time. The MSCs inform the BSSes with a new Message "A-Connect" to through-connect the User Plane in LCLS. The MSCs inform the MGWs that no User Plane traffic is to be expected.

An Information Element is provided, both on the A-Interface and the Nc-Interface. Some new Messages are provided on the A-Interface. They are marked by a gray shaded background in the example Call Flow of FIGS. 7A-7B. For this MS-to-MS call with two MSCs, FIGS. 7A-7B illustrate one potential LCLS solution for the case that LCLS is feasible. The OoBTC negotiation in this example here is again based on BICC.

Since the early days of GSM, the "Late Assignment" and the "MS-generated Ring-back tones" are valid options. Since no User Plane may exist during the Ringing phase, if Late Assignment is applied, the originating MS can generate the Ring-back tone locally. The Core Network informs the MS accordingly by the "Progress Indicator" IE within the "ALERTING" message (for details see 3GPP TS 23.108 and TS 24.008). Late Assignment has several drawbacks and is not widely deployed, see below. Instead Early Assignment is used and then—when the User Plane is already established—the generation of the Ring-back tone occurs at the terminating network side. The User Plane through the Core Network and through the originating BSS is used to transport the Ring-Back tone to the originating MS. The terminating MGW may generate quite different ring-back tones (for example to identify the network/country, etc), also user-specific ones (Customised Alerting Tone feature requires this) and that makes this option attractive.

This, however, means that the originating Radio-, Abis, A- and Nb-interface User Plane is needed and no saving can be achieved during the Ringing phase. In the context of LCLS this means: even if LCLS is possible later, after the ringing phase, the Abis resources are needed for a considerable amount of time and the cost saving efficiency of LCLS is quite reduced.

It is therefore proposed in the present implementation of LCLS to consider using Early Assignment with MS-generated Ring-back tones for improving the savings. The variance of Ring-back tones may be rather limited (that can be MS-implementation dependent and could be improved), but the User Plane resources can be saved during the ringing phase until CONNECT/Answer.

Figure 8:
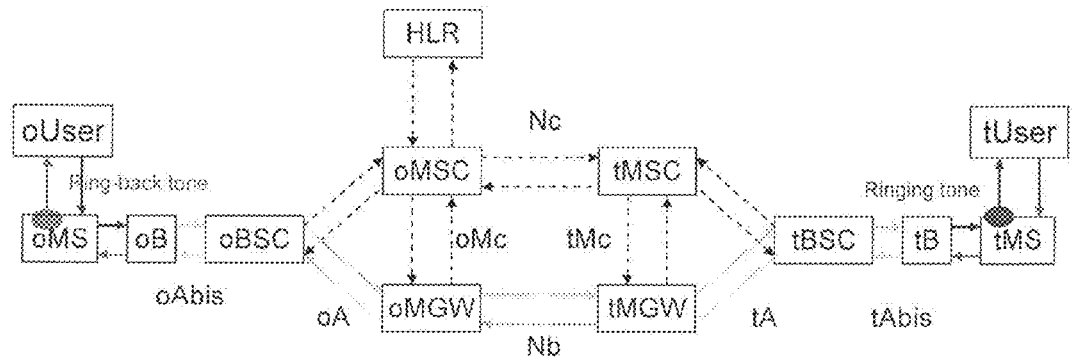
FIG. 8 schematically illustrates a network architecture and the generating of ring tones in an embodiment of the invention.

FIG. 8 shows the User Plane during the Ringing phase, where Early Assignment is used to establish the Radio interfaces. In this example the Abis-, A- and Nb-interfaces are marked in grey colour, because they are not needed in this stage.

Figure 9:
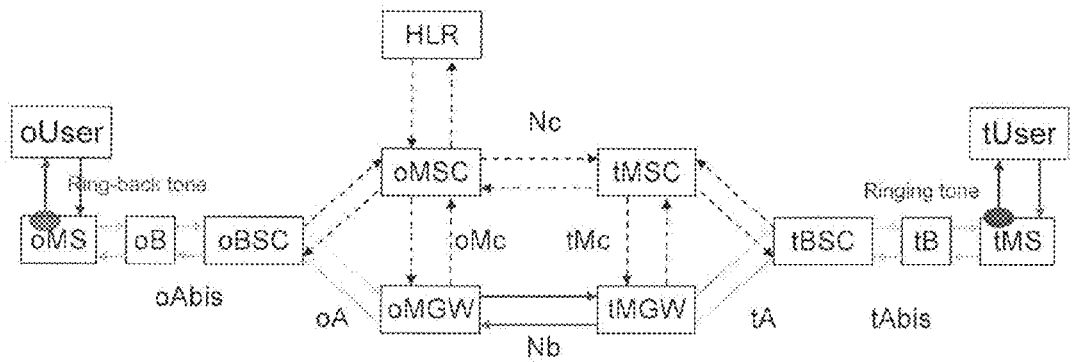
FIG. 9 schematically illustrates a network architecture and the generating of ringing tones in an embodiment of the invention.

The signalling for call setup with Late Assignment can be at the beginning identical to the signalling with Early Assignment—up to the point when the tMS is found and has responded, the Selected Codec (SC) and the Preferred terminating RAN Codec (tRanC) are determined and the SC reported to oMSC. The following description assumes that the feature local Ring-back tone in oMS is applied. In case of Early Assignment, the radio and terrestrial resources are then allocated on both call legs. In case of Late Assignment no resources are allocated at this point in time in the BSSes, but immediately the Ringing is triggered in tMS and the local Ring-back tone in oMS. No User Plane traffic is seen, until tUser accepts the call. FIG. 9 indicates this with grey-shaded arrows on radio-, Abis- and A-links. The Nb-links through the CN are allocated, but in fact no traffic is flowing and in case of a packet-switched CN, no load is generated.

Typically tUser accepts after he hears the Ringing, finds his mobile and decides that the call is interesting enough. This may take a considerable time; a considerable amount of calls are never answered. No User Plane costs are generated up to this point. Now, tUser has accepted the call. tMS informs first of all tMSC by the "Connect" message. Then tMS stops the Ringing Tone, informs tUser with a display message "Connected", which is rather early. tMSC sends Assignment-Request to tBSS; the tRadio-leg is set up in the background, then tMSC informs tMGW; tMSC forwards the "Connect" message to oMSC. oMSC sends Assignment-Request to oBSS; the oRadio-leg is set up in the background, then oMSC informs oMGW; oMSC forwards the "Connect" message to oMS; oMS informs oUser with a display message "Connected". The call is now set up, the users can communicate in both directions.

These "Connect" signalling messages backward from tMS to oMS and "southbound" to the MGWs are again (as in Early Assignment) in a "race condition" with the User Plane signal from tMS to oMS. But this time, tUser starts talking typically much earlier than the User Plane is setup and a substantial part of his first utterances can be lost. In a non-negligible portion of calls, the User Plane can not be established and the call attempt ends with failure. The User experience from real networks is may thus be negative. The operator has a substantial cost advantage, but the User dissatisfaction may be too strong to be leveraged by the savings.

To over come the disadvantages of Late Assignment, but still preserve as much as possible the positive effect a new mode is proposed here, called "Early Assignment—Late Abis Activation" or just in short "Late Abis Activation". The signalling for call setup with Early Assignment—Late Abis Activation is very similar and in most parts identical to the signalling with legacy Early Assignment. The radio resources are allocated on both call legs. To achieve Late Abis Activation the MSCs informs the BSS in Assignment-Request by a new information element (IE) (or even just a flag within the LCLS-Preference IE) that (still) no User Plane traffic is necessary. It is then up to the implementation within the BSS, how much User Plane saving is actually achieved.

In an All-IP transport plane, no IP traffic is seen and the statistical multiplexing gain is high, both inside the BSS and on the AoIP-links. No Transcoder resources are needed. In a TDM (Time Division Multiplexing) based transport plane, it is up to the BSS to allocate—or not—the Abis-links. It is also up to the BSS to allocate Transcoder resources—or not. Finally, the "Connect" message arrives from tMS to tMSC and oMSC. Then tBSS and oBSS are informed by the new "A-CONNECT" message on the A-Interface and the BSS User Plane is established, either with Local Switching, or with the User Plane through the Core Network. This User Plane establishment may only concern the landline parts of the BSS, the radio interface is already up and running and so the User Experience may not be different to the one with legacy Early Assignment. The signalling for LCLS may be designed in such a way that Late Abis Activation is supported with minimum effort. Late Abis Activation may also be applicable to calls where LCLS is not feasible.

Figure 10:
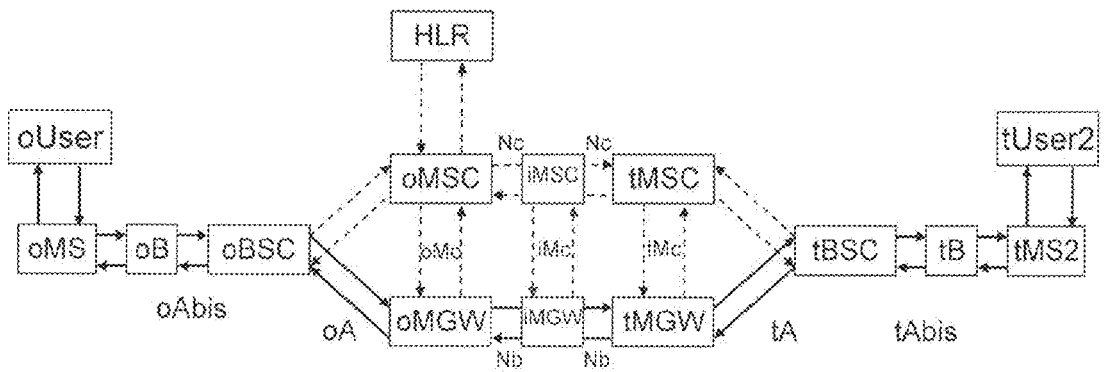
FIG. 10 schematically illustrates a network architecture according to an embodiment of the invention comprising a further core network node between the originating and terminating access gateways.

FIG. 10 shows the network architecture for one example call scenario with three MSCs in the path. Only important signalling links are shown with dashed lines, the User Plane is shown in solid lines. In this example, a configuration is deployed for improving resource saving in both RANs: MS-generated Ring-back tone and Late Abis Activation. No announcements or other network-generated User Plane signals are used.

A number of call scenarios can occur to create multiple MSCs in the call chain, such as the call being routed to a subscriber who has user determined supplementary services active, "call forward on user determined busy", "call forward on no reply" etc. The call may be routed to a subscriber of another operator, who has roamed into the callers PLMN (Public Land Mobile Network) and BSS Serving Area.

In the following example the call is assumed to be forwarded to a third mobile (tMS2). When oUser triggers the call setup towards tMS1, oMSC interrogates the HLR (Home Location Register) and finds tMS1 registered in iMSC. The routing continues to iMSC, the call is paged and "BUSY" indication is returned. In this example iMSC detects that the call is forwarded to another mobile number, tMS1, which is registered in tMSC. The routing continues to tMSC and now tMS2 is paged. Once tMS2 has responded, the speech path is setup by oMSC sending oAssignment-Request and tMSC sending tAssignment-Request and both outer MSCs allocating all necessary resources in oMGW, tMGW and between the nodes. iMSC is involved (or associated) with iMGW. It has to be noted that iMSC and iMGW have no direct communication with the RANs and influence on LCLS must happen through the outer MSCs. Due to this fact, use is made of the proposed "LCLS-Negotiation" through the Core Network as already discussed in the previous call scenario with two MSCs. Only if the iMSC understands (i.e. is an enabled node) and agrees to LCLS, the LCLS is offered to the RANs in the present implementation. This case is assumed in the following, e.g. the iMSC does not need to access the User Plane.

Again the setup of the radio resources takes a considerable time. Both outer MSCs indicate to both RANs that Abis-Activation is still suppressed (Late Abis Activation). The Global Call Reference is passed down together with the LCLS-Preference to both RANs. Finally, when the User Plane is setup within the CN and on Radio, the Ringing tone within tMS2 is started and oMSC triggers the local Ring-back tone within oMS. The User Plane on the A-Interfaces and through the Core Network may be setup in this example, the MGWs block the User Traffic, but need not to generate any messages or tones. RAN resources (Abis-, TRAU, . . . ) may thus be saved. When finally tUser2 answers the call, the message flow and call setup continues as in the example with two MSCs, the inner iMSC is just passing the CN signalling. The iMSC remains in the call path during the whole communication. Since the User Plane is locally switched (local shortcut) in this example within the RAN and this is confirmed by the LCLS-Status Notification (see above), there will be no User Plane traffic through the Core Network. All MGWs may be informed. This may occur according to any of the above mentioned methods.

In the following, a particular implementation making use of a GERAN access network is described. The implementation makes use of the following assumptions and considerations.

Local Switching reuses existing (Rel-8) Procedures, Messages and Information Elements on the A-Interface as far as possible to keep the impacts small. Local Switching reuses the existing (Rel-8) Architecture Split between BSS and CN as far as possible. One common Local Switching solution supports AoTDM and AoIP and all combinations of them. Local Switching is applicable within a single BTS, but possibly also between BTSes. The implementation supports on the A-Interface all kinds of Local Switching within a BSS. The MSC may, however, not know beforehand—without BSS signalling—whether or not Local Switching is possible, therefore the final decision whether to establish Local Switching or not is performed by the BSS. Whether procedures and messages on the A-interface for Local Switching will be performed independently on the two legs of the call is up to the particular realization. The Local Switching is established by the BSS by internal means, but only if it got permission from the MSC(s) to do so. If the BSS receives signalling that for one radio leg Local Switching is not or no longer possible, then the BSS does not establish Local Switching or breaks an established Local Switch.

The MSC(s) are responsible to bind the two radio legs together by appropriate means and finally submitting this to the BSS to allow seeing the correlation. Local Switching does not involve (has no need for) transcoding between the radio legs, i.e. there is no need for Transcoders in BSS. Transmission of in-band user plane information (ring-back tone at call setup and mid-call in-band announcements) from the Core Network is supported. Local Switching is sometimes not possible, or needs to be released, e.g. if a Supplementary Service (Multi Party Conference, Announcement, etc) is necessary. The MSC controls this. If certain supplementary services for an ongoing call are necessary, implying that the User Plane through the Core Network needs to be (re)established, the Local Switching may be broken by the MSC(s) after negotiation with the BSS. Inter-BSS Handover is possible, leading to a break or an establishment of Local Switching.

Inter-MSC Handover is possible, leading to a break or an establishment of Local Switching. Inter-System Handover (e.g. 2G<=>3G) is possible, leading to a break or an establishment of Local Switching.

If AoTDM is used, it the TDM circuit of the A-Interface may be released while the Local Switching is established in the BSS (and after the BSS has informed the MSC). If AoIP is used, the IP link on the A-Interface may be released while the Local Switching is established in the BSS (and after the BSS has informed the MSC). In any case, user plane transmission on the A-interface can be suspended while the Local Switching is established (even if the IP endpoint on the BSS and MGW sides are not released), making bandwidth saving on the AoIP interface possible. Both sides, BSS and/or MSC(s), are allowed to break the Local Switch any time, if needed. If the Local Switch has to be broken, this needs to be negotiated between BSS and MSC(s). The Codec Type and/or Codec Configuration may be changed by the BSS autonomously after the Local Switch is established, provided that same or compatible Codec Type and/or Codec Configuration are used on the two legs of the call. However, the MSC(s) is (are) informed after the change. One possible exception is when the AoIP with TC in MGW option is being used: this may trigger the BSS-internal HO procedure and/or this may release the Local Switching. Note that only Codec Types and Codec Configurations provided by the MSC(s) to both radio legs may be used. If two incompatible Codec Types and/or Codec Configurations are to be used on the two legs of the call, the Local Switching is released beforehand, i.e. this kind of handover is not allowed while local Switching is established.

Intra-BSS handovers may be performed by the BSS autonomously after the Local Switch is established. The MSC(s) is (are) informed after the Handover about all changed parameters (Cell ID, Codec Type, whatever). Transmission of DTMF tones is supported. Charging aspects arising from Local Switching (if any) are considered in the standard.

The implementation makes use of the following considerations for the core network (CN). Any number of MSCs may be in the signalling path, and therefore, impacts to the Nc interface are considered. Core networks components (MSC-Servers and MGW's) owned by different operators can be involved in a call that supports LCLS. Upgraded (LCLS compliant) and legacy (non LCLS compliant) MSCs may exist in the path. All MSCs (nodes in the path) must permit LCLS in the present implementation. If one node denies LCLS (legacy MSC or intentionally), then all other MSCs are informed at call setup and during the call and LCLS is stopped.

Lawful Interception should remain possible also when the Local Call Local Switch feature is activated, and the main functionality should remain in the Core Network. The general requirements on Lawful Interception are specified in 3GPP TS 33.106. In order to allow support for the Lawful Interception feature in the Core Network, user plane data for CS (circuit switched) voice calls to be intercepted needs to be conveyed to the Core Network, even if the calls are local. Possible implementations of a corresponding solution are detailed below.

In one implementation, whenever the MSC-S is aware that a local call needs to be intercepted, it does not allow the BSS to establish local switching in the BSS. The problem of this implementation is that it might not be possible to maintain the same end user perception in all the cases, in terms of end-to-end speech delay. The delay might in fact vary between "not locally switched, intercepted local calls" and "locally switched, non-intercepted local calls". This could happen for instance in some scenarios where the Local Call Local Switch feature would be typically deployed, i.e. whenever a satellite backhaul is used to connect a group of BTS's to the BSC/MSC-S. In this case the delay of a locally switched call will be ~600 ms shorter than for a normal call, unless an artificial delay is added for all the locally switched calls (which is of course not desirable), and this difference would be easily noticeable by the end user.

In another implementation, local switching is also enabled for intercepted calls, with the goal to maintain the same end user perception in terms of end-to-end speech delay. This can be achieved if the user plane data is both locally switched and forwarded to the Core Network as well, while user plane data coming from the A interface is dropped at the BSS side. In order to support this, it may be sufficient to introduce a conditional "Bi-casting required to the MSC" Information Element in the new/modified BSSMAP messages used by the MSC-S to allow the BSS to establish Local Switching. This solution implies that some sort of indirect indication that a call will be intercepted will be conveyed to the BSS via some signalling message. However, the A-interface control messages containing this information can be protected (e.g. via IPSec) so that such information cannot be sniffed or traced. An advantage of this implementation is that also for intercepted calls, LCLS is possible. The implementation may also maintain the same end user perception in terms of end-to-end speech delay. Yet the implementation may require modifications on the BSS side because of required bi-casting capability and additional A-interface signalling.

Particular implementations for handling the user (or media) plane are detailed below. Benefits of Local Call Local Switch feature can be the saving of transmission bandwidth on BSS internal interfaces, Abis and Ater. Establishing local switching in the present implementation means that either the call is switched in the BSC or a direct communication is created between the involved BTSs. In any case, the effect is that some resources on the BSS internal interfaces (Abis and Ater) can be saved. The specific solution will be based on BSS network topology and remains implementation specific.

To minimize changes to existing AoTDM deployments and to ongoing AoIP implementations, the impact on the A interface user plane handling is kept as low as possible in the present implementation. For AoTDM, no changes to the A interface user plane handling should be defined. Even if a call is locally switched, the two corresponding circuits may always remain active, meaning that bandwidth savings on the A interface for locally switched calls are not possible, but bandwidth savings can be realized on the Abis/Ater interfaces, of course. While a call is locally switched, the TRAU will send some silence codeword on the A interface. Also for AoIP, the two IP connections towards the MSC-S may always remain active, i.e. the corresponding IP endpoints may not be released. In any case, for AoIP it may be possible to suspend user plane transmission, and hence save bandwidth, while the call is locally switched. Therefore, while a call is locally switched, the MSC-S (MGW) may not expect to receive data through the IP endpoints. It should be noted that this implementation may have an impact on the H.248 interface: the MSC-S can inform the MGW about established and released Local Switching so that the MGW can start and stop to suspend the AoIP user plane transmission. For the mixed AoTDM-AoIP case (one leg of the call using AoTDM, the other using AoIP), the proposal is again to keep the circuit and the IP connection active throughout the call. Whether user plane data is sent on the IP connection while the call is locally switched could depend on the presence or not of a Transcoder in the BSS for this leg of the call.

This implementation may simplify the procedures to establish and release Local Switching in the BSS at call setup and handover, on the A-interface and on the Core Network interfaces (e.g. for allocation/release of resources on the MGW). As a further benefit, this approach may simplify the handling of in-band announcements for a call which is locally switched, because with this solution, there is no need e.g. to re-establish circuits or IP endpoints just to deliver the announcement to the target user.

The BSS and CN should know their capabilities regarding LCLS. For minimizing the signalling overhead within the CN, the BSS may inform the CN as early as possible. The other direction, CN to BSS, seems less critical.

One option would be to configure the BSS-capabilities within each MSC by O&M parameters and the MSC capabilities within each BSS by other O&M parameters. Then no additional signalling for the capability exchange is necessary. However, this approach may require hand-administration. Further the whole BSS should be homogeneously supporting LCLS or the LCLS attempt would fail rather often. This administrative approach is rather static and can not react quickly on changing conditions.

To overcome these drawbacks, the implementation may add a new information element (IE) (termed "LCLS-BSS-Capability") in the Assignment_Request_Response message. But this is a bit late in the process, the CN would have to do pro-active signalling for LCLS without knowing if that would ever be successful.

A further option is to add a new IE (termed "LCLS-Capability") on the A-Interface, per call leg, within the "Complete Layer 3" Message. This is the approach already taken for the AoIP-Capabilities. The same new IE could be used by oBSS and tBSS. The MSCs would be informed at a very early point in time and per call leg, so very accurate. This approach supports a non-homogeneous BSS, i.e. some parts of the BSS could (already) support LCLS, while others are (still) not capable. This new IE can comprise at least one binary flag "LCLS-Yes"/"LCLS-No". Default is "LCLS-No" and this is assumed, if the IE is not present. A finer granularity of this LCLS-Capability may also be implemented. One octet may be allocated for this purpose. oMSC would only start to deploy the additional signalling for LCLS if it knows that the oBSS supports it. tMSC would only apply signalling for LCLS if it knows that tBSS supports it. By the selective further signalling, e.g. a selective inclusion of the information element for collecting user plane access need of core network node, signalling overhead in the core network may be reduced.

The access gateways, here the oMSC and tMSC can accordingly be informed (e.g. by the IE "LCLS-Capability") that a local shortcut is possible in principle.

After the CN got the LCLS-Capability from both radio legs and has negotiated along the routing path that LCLS is feasible (see further below), it sends the LCLS-Negotiation result within Assignment Request to the BSSes. A new IE "LCLS-Preference" may be introduced, which is sent within the Assignment Request message from the MSC to the BSS on a per call-leg basis. It may instructs the BSS on the possibilities and preferences for LCLS for the call-leg.

The MSCs within the CN have no knowledge about the other ends call-leg or radio access network. They send therefore further a new Global Call Reference (see further below), which is unique for the call, within Assignment Request to each BSS on a per call-leg basis to allow the correlation of call-legs of one call, if both end in one BSS. A new IE "Global Call Reference" may be introduced, which may be sent within the Assignment Request message from the MSC to the BSS on a per call-leg basis.

After the BSS got the LCLS-Preference and the Global Call Reference and identified that LCLS is feasible, it reports the LCLS-Status in the Assignment Acknowledge message to the CN. Since both MSCs (oMSC and tMSC) send the Assignment Request at different points in time to the BSS, the LCLS-Status is only fully known and stable after the second Assignment Request (oAssignment-Request or tAssignment-Request, whichever comes later). An additional new Message may be used, termed "LCLS-Notification", which is send whenever the BSS detects that the LCLS-Status has changed. The MSCs use this LCLS-Status to determine how to handle the User Plane within the Core Network. A new Message "LCLS-NOTIFICATION" and a new IE "LCLS-Status" may thus be introduced. The LCLS-Status IE may be sent in the Assignment Acknowledge message and in the new LCLS-Notification message, whenever it is necessary to inform the CN about a change in the LCLS-Status.

The Assignment Requests allow determining the feasibility for LCLS within the BSS. But at that time, the tUser has still not accepted the call and the User Plane should still not be through-connected. The Connect information is up to the REL-8 not send to the BSS, but only to the MS. Therefore, a new Message "A-CONNECT" may be introduced from CN to BSS.

There are situations, where one MSC is upgraded to LCLS and the other MSC is still not upgraded. The implementation thus takes the "MSC-LCLS-Capability" of each node into account. There are situations, where the User Plane is needed within the CN, e.g. where LCLS is not allowed, but only one of the MSCs knows about that. Here, the "LCLS-MSC-Preference" of each node should be taken into account. Possibilities to negotiate LCLS-Capability and LCLS-Acceptance between oMSC and tMSC are given hereinafter.

Figure 11:
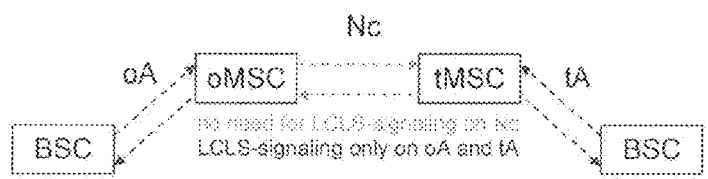
FIG. 11 schematically illustrates a possibility of setting up a local shortcut.

One option is that the common BSS (if it exists) tells both, oMSC and tMSC, about its BSS-LCLS-Capability, e.g. in a new IE as outlined above. Both MSCs, oMSC and tMSC, tell this BSS about their individual MSC-LCLS-Capability and their individual MSC-LCLS-Preference in Assignment Request. In this way no additional signalling between the MSCs may be necessary regarding the LCLS-Negotiation. The combining of all necessary information may then only be performed within the BSS, which controls both call legs. This is illustrated in FIG. 11. The advantage of this option is the simplicity on the Nc-Interface. The disadvantage is that neither oMSC nor tMSC has a complete overview concerning LCLS-capabilities and status. They don't know in the first phase that the identical BSS is used on both call legs. They may be informed later by the BSS that LCLS is feasible and/or established.

Figure 12:
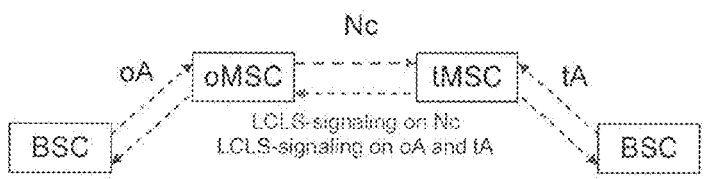
FIG. 12 schematically illustrates signalling between an originating and terminating access gateway in the core network when setting up a local shortcut in accordance with an embodiment of the invention.

Accordingly, the present implementation uses LCLS signalling between the oMSC and the tMSC by including an information element in the connection set-up signalling in the core network, as illustrated in FIG. 12. The oMSC tells the tMSC about the oBSS-LCLS-Capability and its own oMSC-LCLS-Capabilities and its own oMSC-LCLS-Preference. A new IE "LCLS-CN" can be exchanged between oMSC and tMSC in forward direction on the Nc-Interface to signal the "LCLS-Capability and LCLS-Preference". The same IE may also be useful in backward direction. It may then also include the actual "LCLS-Status". Possible contents and structure of such an information element (here termend "LCLS-CN") are discussed in detail above. The implementation requires only a slightly higher signalling effort on Nc. The advantage of this implementation is that tMSC knows in a very early phase that LCLS is a candidate or not. A further advantage is that any time during the call, this new IE could be used to signal changes in LCLS-Capability, LCLS-Preference and LCLS-Status. A further advantage is seen in call scenarios with more than two MSCs in the routing path (i.e. signalling path). Further MSCs in the path can enter their LCLS-Capability and/or LCLS-Preference into the information element, i.e. their needs to access the media plane.

In an example implementation, a new IE "LCLS-CN" is introduced, with one octet, fixed length. If BICC or ISUP is used on Nc, then the LCLS-CN IE is sent within the IAM Message (set-up message) in forward direction and within the Mobile APM Message (response message) in backward direction. IF SIP-I is used on Nc, then the LCLS-CN IE may be sent in a separate SIP header or within encapsulated IAM in the SIP-I-Invite in forward direction, and in separate SIP header or encapsulated ISUP Mobile APM in SIP-Response in backward direction.

Typically, the oMSC does not know anything about tBSS; tMSC does not know anything about oBSS, i.e. the MSCs don't care, whether the identical BSS is used on both call legs. But the MSCs know the call identity, at least indirectly. On the other hand the BSS does typically not care which call legs belong to one call. The BSS does not know a global call identity. The BSS just knows the identity of each call-leg (CIC or AoIP Call Identifier). Again different two options exist to solve this problem and to match RAN-Identity and Call-Identity.

In a first option, the MSCs inform each other which RAN is used: if oRAN and tRAN are identical, then the MSCs know that LCLS is feasible. Unique RAN-Identities may be defined and exchanged, new CN signalling may be required. This option requires the definition and maintenance of globally unique RAN-Identifiers; it allows to some extend to identify the location of the other user (personal-data security issue); it also requires additional signalling through the Core Network in case of Inter-RAN handover.

In a second option, the MSCs define and negotiate a unique Call Identifier for the call, which is then known to all nodes in the routing path. In complex call scenarios, this Call Identifier may be globally (i.e. world wide) unique. Then the MSCs inform the RAN(s) about the Global Call Identity on each call-leg: if the Call Identifiers of oMS and tMS are identical, then the RAN knows that the call originates and terminates at the same BSS and therefore LCLS is feasible. This options uses the definition and exchange of a Globally Unique Call Identifier, which means new CN and new A-Interface signalling. This option has particular advantages with respect to call scenarios with more than two MSCs in the routing path.

Such an Unique Call Identifier is specified in ITU-T Q.1902 series, called "Global Call Reference" (GCR). The GCR is worldwide unique, also across network boundaries. This GCR was introduced for charging purposes in complex call scenarios. A possible parameter layout of this Global Call Reference is shown in the following table:

| 8 | 7 | 6 | 5 | 4 | 3 | 2 | 1 | octet |
|---|---|---|---|---|---|---|---|---|
| | | Network ID length indicator (3 . . . 5) | | | | | | 1 |
| | | Network ID | | | | | | 2 |
| | | (variable length) | | | | | | 3 |
| | | | | | | | | 4 . . . 6 |
| | | Node ID length indicator (2) | | | | | | 5 . . . 7 |
| | | Node ID | | | | | | 6 . . . 8 |
| | | (fixed length) | | | | | | 7 . . . 9 |

-continued

| 8 | 7 | 6 | 5 | 4 | 3 | 2 | 1 | octet |
|---|---|---|---|---|---|---|---|---|
| | | Call Reference length indicator (3) | | | | | | 8 . . . 10 |
| | | Call Reference ID | | | | | | 9 . . . 11 |
| | | (fixed length) | | | | | | 10 . . . 12 |
| | | | | | | | | 11 . . . 13 |

The maximum length of this IE, including the length indicators, is 13 octets. In general all call legs which belong to one call use the same Global Call Reference. This includes, but is not limited to Call Forwarding, Roaming, Rerouting or Reselection. The GCR of the call will also be sent by the Anchor MSC in the IAM (ISUP/BICC) on the handover/relocation call leg towards the Non-anchor MSC. The nodes in the call path to the new location of the MS will then receive and be able to use this GCR.

The already specified Global Call Reference may be used for LCLS, both, within the CN and between CN and RAN. The oMSC generates a "Global Call Reference" (GCR), when it receives the Service Request from the oMS. This GCR is then sent along the routing path, finally arriving at tMSC. All nodes within the path have the opportunity to note this GCR. This GCR is kept until the call is terminated. oMSC sends this GCR within the oAssignment-Request to the oBSS for the oCall-leg; it is stored there; tMSC sends this GCR within the tAssignment-Request to the tBSS for the tCall-leg; it is stored there, too. Both oMSC and tMSC send in addition their LCLS-Capability and LCLS-Preference to oBSS and tBSS at Assignment.

Then tBSS performs the correlation of the received GCR for the tCall-leg with all stored GCRs and finds the corresponding oCall-leg for LCLS, if oBSS and tBSS are identical. If successful, then tBSS marks both call legs as "LCLS-identified". tBSS reports the result of the correlation to tMSC in tAssignment-Response. At the same time oBSS (which is identical to tBSS) notifies the LCLS-Status to oMSC. Then the preparation for LCLS is finished. But LCLS is still not established to avoid a too early through-connect of the User Plane, which could invite to fraud.

The MSC(s) may perform the following procedure to control the user plane connection. Assume the call is still in the call setup phase. The tMS started ringing and oMS receives and plays the ring-back tone. The User Plane is established end-to-end in both directions through the Core Network, but the traffic is blocked in oMGW and tMGW. A direct local shortcut within the BSS would bypass this user plane connectivity control in the CN and would therefore allow fraudulent user data to pass prior to answer/charging. It would also bypass the User Plane between the Ring-back tone, generated by tMGW and the oMS. The BSS may determine the correct point in time to establish LCLS as follows.

Without new signalling on the A-Interface, this may be achieved by "sniffing" into the DTAP signalling between MSC and MS.

Another possibility is to use a new procedure, message and IE which can inform the BSS when to "Connect". This procedure may be called "A-Connect", the message may be called "A-CONNECT" and the IE may be called "A-Connect-Control". The trigger for this A-Connect procedure can be the "Connect" message from tMS, which is seen by tMSC and oMSC. Both, tMSC and oMSC, send the new Message A-CONNECT to both tBSS and oBSS, respectively. The content, i.e. the coding of the IE A-Connect-Control can in general be identical on both A-Interfaces, but could may also be different. If both call legs receive an explicit A-CONNECT message and the contents allows LCLS, then BSS establishes the LCLS. The tBSS call leg gets the tA-CONNECT message in general earlier than the oBSS call leg gets the oA-CONNECT message. But neither tBSS nor oBSS may acknowledge this message before the status of LCLS is clarified, i.e. not before both call legs got the A-CONNECT message and LCLS is established—or it may be clarified that LCLS can not be established.

It should be clear that the general teachings given further above may be applied to the specific implementations described herein. In particular, the different methods of collecting the media plane access needs, establishing the media plane and detecting legacy nodes in the signalling path can be applied to the specific implementations. The skilled person will appreciated that the features of the above aspects, embodiments and implementations of the invention can be combined to from other embodiments that are within the scope of the present invention.

While specific embodiments of the invention are disclosed herein, various changes and modifications can be made without departing from the scope of the invention. The present embodiments are to be considered in all respect as illustrative and non-restrictive, and all changes coming within the meaning and equivalency range of the appended claims are intended to be embraced therein.

The invention claimed is:

1. A method of establishing a call between an originating terminal and a terminating terminal that access a core network via the same radio access network (RAN), the method implemented by an access gateway in the core network, the method comprising, during establishment of the call:
   receiving a first information element that indicates what level of user plane access core network nodes in a control path of the call require;
   determining at the access gateway whether to allow a user plane of the call to be locally switched within the RAN; and
   if the access gateway determines to allow the call's user plane to be locally switched within the RAN, sending from the access gateway to the RAN a second information element that indicates a preference for locally switching the call according to the level of user plane access said core network nodes require.

2. The method of claim 1, wherein said user plane comprises a forward channel from the originating terminal to the terminating terminal and a backward channel from the terminating terminal to the originating terminal, wherein the first information element indicates whether said core network nodes require read access to the forward channel, whether said core network nodes require write access to the forward channel, whether said core network nodes require read access to the backward channel, and whether said core network nodes require write access to the backward channel.

3. The method of claim 1, wherein said user plane comprises a forward channel from the originating terminal to the terminating terminal and a backward channel from the terminating terminal to the originating terminal, wherein the first information element includes:
   a first binary flag for indicating whether or not at least one of said core network nodes requires read access to the forward channel;
   a second binary flag for indicating whether or not at least one of said core network nodes requires write access to the forward channel;
   a third binary flag for indicating whether or not at least one of said core network nodes requires read access to the backward channel; and
   a fourth binary flag for indicating whether or not at least one of said core network nodes requires write access to the backward channel.

4. The method of claim 1, wherein the access gateway is an originating access gateway through which the core network is accessed for the originating terminal, wherein the method further comprises sending a message towards a terminating access gateway through which the core network is accessed for the terminating terminal, wherein the message is for establishing the call and includes the first information element, and wherein said receiving comprises receiving from the terminating access gateway a response to the message that includes the first information element as modified by said core network nodes in the call's control path.

5. The method of claim 1, wherein the access gateway is a terminating access gateway through which the core network is accessed for the terminating terminal, wherein said receiving comprises receiving a message from an originating access gateway through which the core network is accessed for the originating terminal, wherein the message is for establishing the call and includes the first information element as modified by said core network nodes in the call's control path.

6. The method of claim 1, wherein said sending comprises sending the second information element within a message that requests the RAN to assign channels for the call.

7. The method of claim 1, wherein the call has a first radio leg associated with the originating terminal and a second radio leg associated with the terminating terminal, and wherein said sending comprises sending the second information element to the RAN on a per call-leg basis.

8. A method of establishing a call between an originating terminal and a terminating terminal that access a core network via the same radio access network (RAN), the method implemented by a core network node in a control path of the call, the method comprising, during establishment of the call:
   receiving an information element that indicates what level of user plane access one or more other core network nodes in the call's control path require;
   modifying the information element at the core network node to indicate what level of user plane access the core network node requires beyond that already indicated by the information element as being required by said one or more other core network nodes; and
   sending the modified information element to another core network node in the call's control path.

9. The method of claim 8, wherein said user plane comprises a forward channel from the originating terminal to the terminating terminal and a backward channel from the terminating terminal to the originating terminal, wherein the information element includes:
   a first binary flag that takes on values of "Yes" or "No" for respectively indicating whether or not read access to the forward channel is required;
   a second binary flag that takes on values of "Yes" or "No" for respectively indicating whether or not write access to the forward channel is required;
   a third binary flag that takes on values of "Yes" or "No" for respectively indicating whether or not read access to the backward channel is required; and
   a fourth binary flag that takes on values of "Yes" or "No" for respectively indicating whether or not write access to the backward channel is required.

10. The method of claim 9, wherein said modifying comprises changing the value of any given one of said binary flags from "No" to "Yes" if the core network node requires the level of access indicated by that flag, and refraining from changing the value of any given one of said binary flags from "Yes" to "No" if the core network node does not require the level of access indicated by that flag.

11. The method of claim 8, further comprising adapting the routing of user data through a media gateway of said core network node based on the extent to which core network nodes in the call's control path require access to the call's user plane.

12. The method of claim 8, wherein said user plane comprises a forward channel from the originating terminal to the terminating terminal and a backward channel from the terminating terminal to the originating terminal, and wherein the method further comprises:
    determining whether any nodes in the signalling path require access to the user plane; and
    setting media gateway context and links of a media gateway (MGW) associated with the core network node in order to establish the user plane through the core network, wherein said setting comprises, if said determining indicates that there is no need to transport user data downstream the forward or backward channel, either:
        if the downstream user data link for the respective channel has not been previously established, refraining from establishing said link;
        if the downstream user data link for the respective channel has been previously established, removing said link; or
        setting the downstream user data link for the respective channel to passive, such that no user data is transmitted over the link.

13. A method of establishing a call between an originating terminal and a terminating terminal that access a core network via the same radio access network (RAN), the method implemented by a controller in the RAN, the method comprising, during establishment of the call:
    receiving from an access gateway in the core network an information element that indicates a preference for locally switching the call according to a level of user plane access core network nodes in a control path of the call require; and
    responsive to deciding to establish local switching of the call, establishing local switching of the call in accordance with the preference indicated by the received information element.

14. The method of claim 13, wherein said receiving comprises receiving the information element within a message that requests the RAN to assign channels for the call.

15. The method of claim 13, wherein the call has a first radio leg associated with the originating terminal and a second radio leg associated with the terminating terminal, and wherein said receiving comprises receiving the information element on a per call-leg basis.

16. An access gateway for a core network configured to establish a call between an originating terminal and a terminating terminal that access the core network via the same radio access network (RAN), the access gateway comprising:
    a receiving circuit;
    a transmitting circuit; and
    one or more processing circuits configured, during establishment of the call, to:
        receive, via the receiving circuit, a first information element that indicates what level of user plane access core network nodes in a control path of the call require;
        determine whether to allow the call's user plane to be locally switched within the RAN; and
        if the access gateway determines to allow the call's user plane to be locally switched within the RAN, send to the RAN, via the transmitting circuit, a second information element that indicates a preference for locally switching the call according to the level of user plane access said core network nodes require.

17. The access gateway of claim 16, wherein said user plane comprises a forward channel from the originating terminal to the terminating terminal and a backward channel from the terminating terminal to the originating terminal, wherein the first information element indicates whether said core network nodes require read access to the forward channel, whether said core network nodes require write access to the forward channel, whether said core network nodes require read access to the backward channel, and whether said core network nodes require write access to the backward channel.

18. The access gateway of claim 16, wherein said user plane comprises a forward channel from the originating terminal to the terminating terminal and a backward channel from the terminating terminal to the originating terminal, wherein the first information element includes:
    a first binary flag for indicating whether or not at least one of said core network nodes requires read access to the forward channel;
    a second binary flag for indicating whether or not at least one of said core network nodes requires write access to the forward channel;
    a third binary flag for indicating whether or not at least one of said core network nodes requires read access to the backward channel; and
    a fourth binary flag for indicating whether or not at least one of said core network nodes requires write access to the backward channel.

19. The access gateway of claim 16, wherein the access gateway is an originating access gateway through which the core network is accessed for the originating terminal, wherein the one or more processing circuit are configured to:
    send a message towards a terminating access gateway through which the core network is accessed for the terminating terminal, wherein the message is for establishing the call and includes the first information element; and
    receive from the terminating access gateway a response to the message that includes the first information element as modified by said core network nodes in the call's control path.

20. The access gateway of claim 16, wherein the access gateway is a terminating access gateway through which the core network is accessed for the terminating terminal, wherein the one or more processing circuits are configured to receive a message from an originating access gateway through which the core network is accessed for the originating terminal, wherein the message is for establishing the call and includes the first information element as modified by said core network nodes in the call's control path.

21. The access gateway of claim 16, wherein the one or more processing circuits are configured to send the second information element within a message that requests the RAN to assign channels for the call.

22. The access gateway of claim 16, wherein the call has a first radio leg associated with the originating terminal and a second radio leg associated with the terminating terminal, and wherein the one or more processing circuits are configured to send the second information element to the RAN on a per call-leg basis.

23. A core network node configured to be in a control path of a call, wherein the core network node is configured to establish the call between an originating terminal and a terminating terminal that access a core network via the same radio access network (RAN), the core network node comprising:
- a receiving circuit;
- a transmitting circuit; and
- one or more processing circuits configured, during establishment of the call, to:
  - receive an information element that indicates what level of user plane access one or more other core network nodes in the call's control path require;
  - modify the information element to indicate what level of user plane access the core network node requires beyond that already indicated by the information element as being required by said one or more other core network nodes; and
  - send the modified information element to another core network node in the call's control path.

24. The core network node of claim 23, wherein said user plane comprises a forward channel from the originating terminal to the terminating terminal and a backward channel from the terminating terminal to the originating terminal, wherein the information element includes:
- a first binary flag that takes on values of "Yes" or "No" for respectively indicating whether or not read access to the forward channel is required;
- a second binary flag that takes on values of "Yes" or "No" for respectively indicating whether or not write access to the forward channel is required;
- a third binary flag that takes on values of "Yes" or "No" for respectively indicating whether or not read access to the backward channel is required; and
- a fourth binary flag that takes on values of "Yes" or "No" for respectively indicating whether or not write access to the backward channel is required.

25. The core network node of claim 24, wherein the one or more processing circuits are configured to change the value of any given one of said binary flags from "No" to "Yes" if the core network node requires the level of access indicated by that flag, and refrain from changing the value of any given one of said binary flags from "Yes" to "No" if the core network node does not require the level of access indicated by that flag.

26. The core network node of claim 23, wherein the one or more processing circuits are further configured to adapt the routing of user data through a media gateway of said core network node based on the extent to which core network nodes in the call's control path require access to the call's user plane.

27. The core network node of claim 23, wherein said user plane comprises a forward channel from the originating terminal to the terminating terminal and a backward channel from the terminating terminal to the originating terminal, and wherein the one or more processing circuits are further configured to:
- determine whether any nodes in the signalling path require access to the user plane; and
- set media gateway context and links of a media gateway (MGW) associated with the core network node in order to establish the user plane through the core network, by, if said determining indicates that there is no need to transport user data downstream the forward or backward channel, either:
  - if the downstream user data link for the respective channel has not been previously established, refraining from establishing said link;
  - if the downstream user data link for the respective channel has been previously established, removing said link; or
  - setting the downstream user data link for the respective channel to passive, such that no user data is transmitted over the link.

28. A controller for a radio access network (RAN) configured to establish a call between an originating terminal and a terminating terminal that access a core network via the RAN, wherein the controller comprises:
- a receiving circuit; and
- one or more processing circuits configured, during establishment of the call, to:
  - via the receiving circuit, receive from an access gateway in the core network an information element that indicates a preference for locally switching the call according to a level of user plane access core network nodes in a control path of the call require; and
  - responsive to deciding to establish local switching of the call, establish local switching of the call in accordance with the preference indicated by the received information element.

29. The controller of claim 28, wherein the one or more processing circuits are configured to receive the information element within a message that requests the RAN to assign channels for the call.

30. The controller of claim 28, wherein the call has a first radio leg associated with the originating terminal and a second radio leg associated with the terminating terminal, and wherein the one or more processing circuits are configured to receive the information element on a per call-leg basis.

* * * * *

UNITED STATES PATENT AND TRADEMARK OFFICE
CERTIFICATE OF CORRECTION

| | |
|---|---|
| PATENT NO. | : 9,060,350 B2 |
| APPLICATION NO. | : 14/104101 |
| DATED | : June 16, 2015 |
| INVENTOR(S) | : Hellwig et al. |

It is certified that error appears in the above-identified patent and that said Letters Patent is hereby corrected as shown below:

On The Title Page

On Page 2, in Item (56), under "OTHER PUBLICATIONS", in Column 2, Line 7, delete "Bejing," and insert -- Beijing, --, therefor.

In The Drawings

In Fig. 14, Sheet 13 of 15, for Tag "S32", in Line 1, delete "TRANSMITT" and insert -- TRANSMIT --, therefor.

In The Specification

In Column 1, Lines 7-8, delete "May 4, 2010," and insert -- May 4, 2010, now Pat. No. 8,634,838, --, therefor.

In Column 2, Line 16, delete "contents is" and insert -- contents are --, therefor.

In Column 10, Lines 45-46, delete "of a originating" and insert -- of an originating --, therefor.

In Column 14, Line 6, delete "parties" and insert -- party's --, therefor.

In Column 15, Line 21, delete "conceivable" and insert -- conceivable. --, therefor.

In Column 16, Line 3, delete "trough" and insert -- through --, therefor.

In Column 16, Line 60, delete "In it" and insert -- In its --, therefor.

In Column 17, Line 63, delete "an node" and insert -- a node --, therefor.

Signed and Sealed this
Twenty-ninth Day of December, 2015

Michelle K. Lee
*Director of the United States Patent and Trademark Office*

CERTIFICATE OF CORRECTION (continued)
U.S. Pat. No. 9,060,350 B2

In Column 22, Line 1, delete "rather then" and insert -- rather than --, therefor.

In Column 24, Line 49, delete "network." and insert -- network, --, therefor.

In Column 26, Line 21, delete "are send" and insert -- are sent --, therefor.

In Column 26, Line 35, delete "1: Yes" and insert -- 1: Yes. --, therefor.

In Column 27, Line 13, delete "one ore more" and insert -- one or more --, therefor.

In Column 29, Lines 52-53, delete "backround" and insert -- background --, therefor.

In Column 31, Line 6, delete "mode" and insert -- node --, therefor.

In Column 31, Line 56, delete "tMS1 ," and insert -- tMS2, --, therefor.

In Column 36, Line 64, delete "termend" and insert -- termed --, therefor.